US011498538B2

(12) United States Patent
Bull et al.

(10) Patent No.: US 11,498,538 B2
(45) Date of Patent: Nov. 15, 2022

(54) BRAKING CONTROL DEVICE FOR VEHICLE

(71) Applicant: ADVICS CO., LTD., Kariya (JP)

(72) Inventors: Marshall Bull, Nagoya (JP); Shun Tsukamoto, Kariya (JP)

(73) Assignee: ADVICS CO., LTD., Kariya (JP)

( * ) Notice: Subject to any disclaimer, the term of this patent is extended or adjusted under 35 U.S.C. 154(b) by 664 days.

(21) Appl. No.: 16/479,105

(22) PCT Filed: Jan. 19, 2018

(86) PCT No.: PCT/JP2018/001552
§ 371 (c)(1),
(2) Date: Jul. 18, 2019

(87) PCT Pub. No.: WO2018/135614
PCT Pub. Date: Jul. 26, 2018

(65) Prior Publication Data
US 2019/0381982 A1    Dec. 19, 2019

(30) Foreign Application Priority Data

Jan. 19, 2017  (JP) .............................. JP2017-007940
Jan. 19, 2017  (JP) .............................. JP2017-007941
Jan. 19, 2017  (JP) .............................. JP2017-007942

(51) Int. Cl.
*B60T 8/96*       (2006.01)
*B60T 8/17*       (2006.01)
*B60T 13/74*      (2006.01)

(52) U.S. Cl.
CPC ................... *B60T 8/96* (2013.01); *B60T 8/17* (2013.01); *B60T 13/74* (2013.01)

(58) Field of Classification Search
None
See application file for complete search history.

(56) References Cited

U.S. PATENT DOCUMENTS 5,236,257 A *  8/1993  Monzaki .............. B60T 13/565
                                                303/114.1
2006/0004509 A1*  1/2006  Teslak .................... B60T 1/10
                                                    701/84

(Continued)

FOREIGN PATENT DOCUMENTS

CN    204567647 U  *  8/2015

OTHER PUBLICATIONS

Zhu Haiyan, A kind of electronlmobil (English), Aug. 19, 2015, Machine English translation of CN 204567647 U (Year: 2015).*

(Continued)

*Primary Examiner* — James J Lee
*Assistant Examiner* — Matthew L Parulski
(74) *Attorney, Agent, or Firm* — Buchanan Ingersoll & Rooney PC

(57) ABSTRACT

This braking control device feeds by pressure a braking fluid from a master cylinder to a wheel cylinder, to generate a braking force in a wheel. The braking control device is provided with an input rod; an output rod; first and second electric motors; and first and second racks forming a differential mechanism. When the outputs of the first and second electric motors are controlled, the operation power of the input rod and the displacement of the output rod are controlled independently of each other. Here, in the second rack, the movement, in a backward direction, in response to decrease of a master cylinder fluid pressure is limited within a range of a predetermined displacement by means of two stoppers.

9 Claims, 8 Drawing Sheets

(56) References Cited

U.S. PATENT DOCUMENTS

2013/0181506 A1 7/2013 Weiberle et al.
2014/0342591 A1* 11/2014 Kim ........................ B60L 53/16
  439/159
2016/0107628 A1* 4/2016 Mahnkopf ............ B60T 13/575
  303/115.2
2016/0339890 A1* 11/2016 Cann .................... B60T 13/745
2018/0093653 A1 4/2018 Bull et al.

OTHER PUBLICATIONS

Electric Motor Back-Drive and Braking, Mar. 27, 2013, Groschopp blog (Year: 2013).*
International Search Report (PCT/ISA/210) dated Apr. 3, 2018, by the Japanese Patent Office as the International Searching Authority for International Application No. PCT/JP2018/001552.

* cited by examiner

BRAKING CONTROL DEVICE FOR VEHICLE

TECHNICAL FIELD

The present invention relates to a braking control device for a vehicle.

BACKGROUND ART

Patent Literature 1 describes "a brake system for a vehicle including a braking operation member (10); a first piston-cylinder unit (12), the first piston-cylinder unit (12) being arranged with the braking operation member (10) so that a first piston (14) of the first piston-cylinder unit (12) is displaceable by the braking operation member (10) operated by at least a defined minimum operation amount and a first inner pressure of the piston-cylinder unit (12) increases; at least one wheel brake cylinder, the at least one wheel brake cylinder being hydraulically connected to the first piston-cylinder unit (12) so that a brake pressure of the at least one wheel brake cylinder can be increased by the increased first inner pressure in the first piston-cylinder unit (12); and a first brake booster (24); the brake system for the vehicle including a second piston-cylinder unit (26), the second piston-cylinder unit (26) being arranged with the first brake booster (24) so that a second piston (28) of the second piston-cylinder unit (26) is displaceable by the first brake booster (24) and a second inner pressure of the second piston-cylinder unit (26) is increased, and the second piston-cylinder unit (26) being hydraulically connected with at least one wheel brake cylinder so that a brake pressure of the at least one wheel brake cylinder is increased by the increased second inner pressure in the second piston-cylinder unit (26).

Patent Literature 1 describes a braking control device configured by two piston-cylinder units, which are driven by two electric motors, to perform braking in cooperation with a regenerative brake. Since such a device includes two piston-cylinder units, miniaturization of the entire device is difficult. Therefore, it is desired that the braking control device be miniaturized and the failsafe be further ensured.

CITATIONS LIST

Patent Literature

Patent Literature 1: Japanese Translation of PCT International Application Publication No. 2013-532604

SUMMARY OF INVENTION

Technical Problems

An object of the present invention is to provide a braking control device that can be controlled in cooperation with a regenerative brake, and that can be miniaturized and the failsafe when the device malfunctions can be further ensured.

Solutions to Problems

A braking control device for a vehicle according to the present invention pressure feeds a braking fluid from a master cylinder (MC) to a wheel cylinder (WC) in accordance with an operation of a braking operation member (BP) of the vehicle to generate a braking torque on the wheels (WH) of the vehicle. The braking control device for the vehicle includes an input rod (RDI) connected to the braking operation member (BP); an output rod (RDO) that is movable parallel to a central axis (Jin) of the input rod (RDI) and that presses a piston (PNA) in the master cylinder (MC); a first electric motor (MTF) that generates an assisting force (Fjs) with respect to the input rod (RDI); a second electric motor (MTS) that adjusts displacement (Sro) of the output rod (RDO); "a differential mechanism (DFR) that is configured by a first transmission mechanism (PNF & Gfa) for transmitting output of the first electric motor (MTF) to the input rod (RDI), a second transmission mechanism (PNS & Gsa, PNO & Gsb) for transmitting output of the second electric motor (MTS) to the output rod (RDO), and a third transmission mechanism (PNO & Gfb) for transmitting output of the input rod (RDI) to the output rod (RDO), and that adjusts a relative movement between the input rod (RDI) and the output rod (RDO)"; and a controller (ECU) that controls the first electric motor (MTF) and the second electric motor (MTS) to independently control an operation force (Fbp) acting on the input rod (RDI) and the displacement (Sro). The second transmission mechanism (PNS & Gsa, PNO & Gsb) is configured so that movement in a backward direction (Hrs) corresponding to decrease in fluid pressure (Pma, Pmb) in the master cylinder (MC) is limited to within a predetermined displacement range (hrg).

A braking control device for a vehicle according to the present invention includes an input rod (RDI) connected to the braking operation member (BP), an output rod (RDO) that is movable parallel to a central axis (Jin) of the input rod (RDI) and that presses a piston (PNA) in the master cylinder (MC); a first electric motor (MTF) that generates an assisting force (Fjs) with respect to the input rod (RDI); a second electric motor (MTS) that adjusts displacement (Sro) of the output rod (RDO); a first pinion gear (PNF) connected to the first electric motor (MTF); a second pinion gear (PNS) connected to the second electric motor (MTS); a first rack (RKF) including a first input rack gear portion (Gfa) that engages the first pinion gear (PNF) and a first output rack gear portion (Gfb) different from the first input rack gear portion (Gfa); a second rack (RKS) including a second input rack gear portion (Gsa) that engages the second pinion gear (PNS) and a second output rack gear portion (Gsb) different from the second input rack gear portion (Gsa); an output pinion gear (PNO) that is rotatably supported by the output rod (RDO) and that engages with the first output rack gear portion (Gfb) and the second output rack gear portion (Gsb); and a controller (ECU) that controls the first electric motor (MTF) and the second electric motor (MTS) to independently control an operation force (Fbp) acting on the input rod (RDI) and the displacement (Sro). The second rack (RKS) is configured so that movement in a backward direction (Hrs) corresponding to decrease in fluid pressure (Pma, Pmb) in the master cylinder (MC) is limited to within a predetermined displacement range (hrg).

In a case where the power supply failed, when the driver operates the braking operation member BP to move the piston PNA of the master cylinder MC forward (moving direction corresponding to fluid pressure increase), the second electric motor MTS is rotated and the forward movement of the piston PNA may be inhibited. According to the configuration described above, the movement of the second transmission mechanism in the backward direction Hrs is limited to within the range of the predetermined displacement hrg, and thus the influence of the free rotation of the second electric motor MTS can be suppressed to a minimum.

A second braking control device for a vehicle according to the present invention pressure feeds a braking fluid from a master cylinder (MC) to a wheel cylinder (WC) in accordance with an operation of a braking operation member (BP) of the vehicle to generate a braking torque on the wheels (WH) of the vehicle. The braking control device for the vehicle includes an input rod (RDI) connected to the braking operation member (BP); an output rod (RDO) that is movable parallel to a central axis (Jin) of the input rod (RDI) and that presses a piston (PNA) in the master cylinder (MC); a first electric motor (MTF) that generates an assisting force (Fj s) with respect to the input rod (RDI); a second electric motor (MTS) that adjusts displacement (Sro) of the output rod (RDO); "a differential mechanism (DFR) that is configured by a first transmission mechanism (PNF & Gfa) for transmitting output of the first electric motor (MTF) to the input rod (RDI), a second transmission mechanism (PNS & Gsa, PNO & Gsb) for transmitting output of the second electric motor (MTS) to the output rod (RDO), and a third transmission mechanism (PNO & Gfb) for transmitting output of the input rod (RDI) to the output rod (RDO), and that adjusts a relative movement between the input rod (RDI) and the output rod (RDO)"; a controller (ECU) that controls the first electric motor (MTF) and the second electric motor (MTS) to independently control an operation force (Fbp) acting on the input rod (RDI) and the displacement (Sro); and a lock mechanism (LOK, SLK) that restrains movement in a backward direction (Hrs) corresponding to decrease in fluid pressure (Pma, Pmb) in the master cylinder (MC) of the second transmission mechanism (PNS & Gsa, PNO & Gsb) when the second electric motor (MTS) is not energized.

DESCRIPTION OF EMBODIMENTS

<Symbol of Structural Members, Suffix at End of Symbol, and Moving Direction>

Embodiments of a braking control device for a vehicle according to the present invention will be described with reference to the drawings. In the following description, structural members, arithmetic processes, signals, characteristics, and values having the same symbol such as "ECU", etc. have the same functions. In addition, suffixes ("fr" etc.) added to the end of various symbols are comprehensive symbols indicating which wheel they relate to. Specifically, "fr" indicates the front right wheel, "fl" the front left wheel, "rr" the rear right wheel, and "rl" the rear left wheel. For example, in each wheel cylinder, it is described as front right wheel wheel cylinder WCfr, front left wheel wheel cylinder WCfl, rear right wheel wheel cylinder WCrr, and rear left wheel wheel cylinder WCrl.

In the moving direction (in particular, linear movement) of each structural element, the "forward direction" corresponds to the direction in which the fluid pressure Pwa of the wheel cylinder WC rises and the braking torque of the wheel WH is increased. In contrast, the "backward direction" corresponds to the direction in which the fluid pressure Pwa of the wheel cylinder WC lowers and the braking torque of the wheel WH is decreased. Furthermore, in the structural element that performs rotational movement, the "forward rotating direction" corresponds to the direction in which the fluid pressure Pwa of the wheel cylinder WC rises and the braking torque of the wheel WH is increased. On the other hand, the "reverse rotating direction" corresponds to the direction in which the fluid pressure Pwa of the wheel cylinder WC lowers and the braking torque of the wheel WH is decreased. Therefore, in a state where each structural element is assembled, the "forward direction" and the "forward rotating direction" correspond to each other, and the "backward direction" and the "reverse rotating direction" correspond to each other.

Embodiment of Braking Control Device According to Present Invention

Figure 1:
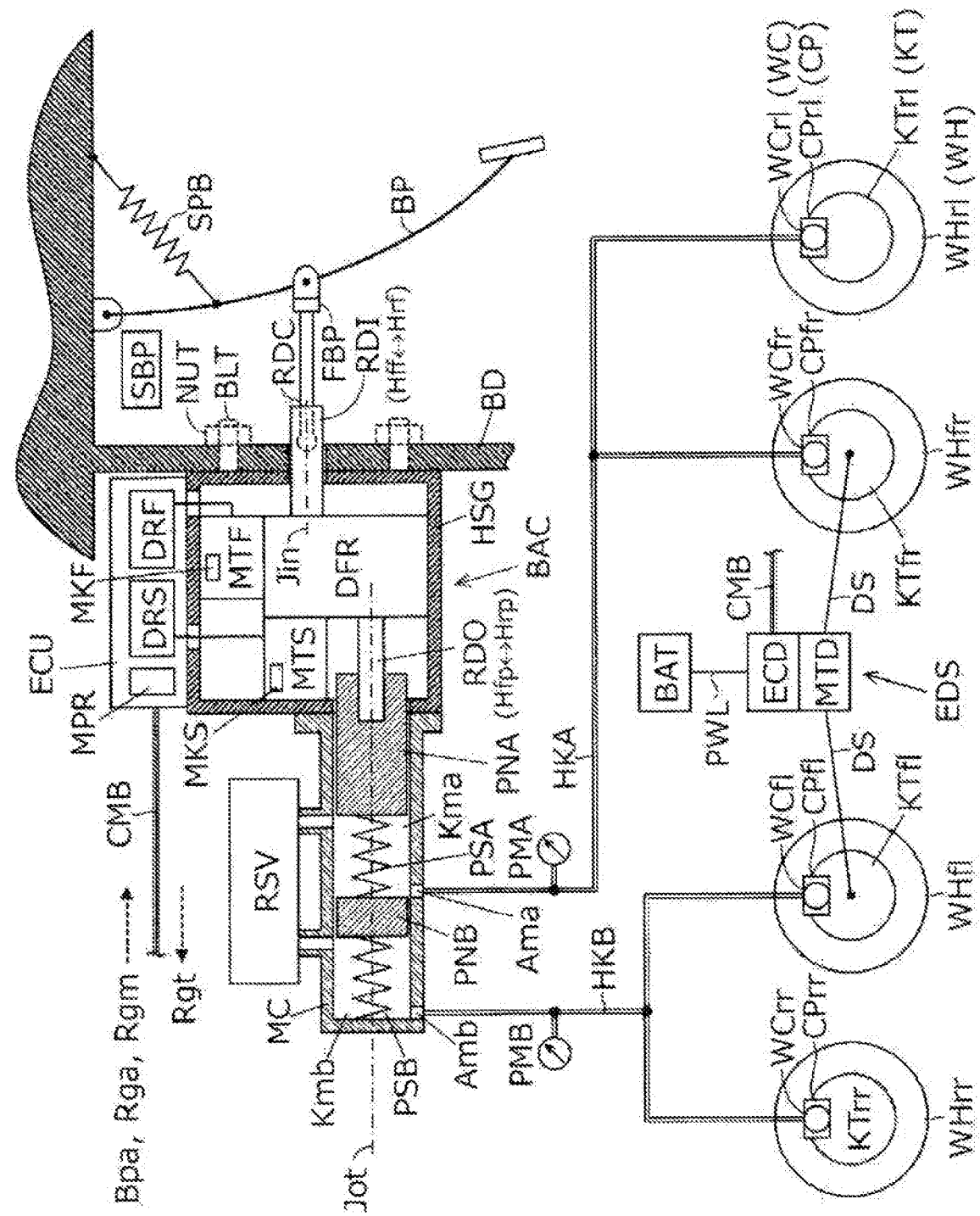
FIG. 1 is an overall configuration view showing an embodiment of a braking control device for a vehicle according to the present invention.

A vehicle provided with an embodiment of a braking control device according to the present invention will be described with reference to an overall configuration view of FIG. 1. The vehicle includes an electric driving device EDS, a braking operation member BP, an operation amount sensor BPA, a braking actuator (also simply referred to as "actuator") BAC, an electronic control unit (also referred to as "controller") ECU, and a tandem master cylinder (also simply referred to as "master cylinder") MC and fluid paths (braking piping) HKA and HKB (also simply denoted as "HK").

The respective wheels WHfr, WHfl, WHrr, WHrl (also simply denoted to as "WH") of the vehicle include brake calipers CPfr, CPfl, CPrr, CPrl (also simply referred to as "caliper", and also denoted as "CP"), wheel cylinders WCfr, WCfl, WCrr, WCrl (also simply denoted as "WC"), and rotating members KTfr, KTfl, KTrr, KTrl (also simply denoted as "KT"). The master cylinder MC, the fluid path HK (general term for HKA and HKB), and wheel cylinder WC are in a fluid tight state.

<<Electric Driving Device EDS>>

The vehicle is equipped with an electric driving device EDS. That is, the vehicle is an electric vehicle or a hybrid vehicle. The electric driving device EDS is configured by a driving electric motor MTD and a driving electronic control unit ECD. For example, on the front wheels WHfr, WHfl of the vehicle, the driving electric motor MTD is provided by way of a drive shaft DS. The vehicle is a so-called front wheel drive.

When the vehicle is accelerated, the driving electric motor (also simply referred to as "drive motor") MTD functions as an electric motor and causes the front wheels WHfr and WHfl to generate a driving force. On the other hand, when the vehicle is decelerated, the drive motor MTD functions as a power generator and causes the front wheels WHfr and WHfl to generate a regenerative braking force. At this time, kinetic energy of the vehicle is converted into power by the power generator MTD and stored in an in-vehicle secondary battery BAT. The drive motor MTD functions not only as a so-called driving force generation device but also as a regenerative braking device.

The driving electronic control unit ECD controls the driving electric motor MTD. The output torque of the drive motor MTD is adjusted by the driving electronic control unit ECD in accordance with the operation amount of an acceleration operation member (e.g., accelerator pedal) (not shown). Furthermore, at the time of braking, the regenerative braking force Rga is controlled by the driving electronic control unit ECD based on the operation amount Bpa of the braking operation member BP through the drive motor MTD which is also a power generator. In the electronic control unit ECD, the charging state of the storage battery BAT is monitored, and based on this, a generable maximum regenerative braking force Rgm is calculated.

The maximum regenerative braking force Rgm is transmitted from the electronic control unit ECD to an electronic control unit ECU via a communication bus CMB. A friction braking force, a regenerative braking force, and the respective target values are determined by a braking electronic control unit ECU. The target value Rgt of the regenerative braking force is transmitted from the braking electronic control unit ECU to the driving electronic control unit ECD via the communication bus CMB, and an actual value Rga is controlled by the electronic control unit ECD based on the target value Rgt. The electric driving device EDS has been described above.

The braking operation member (e.g., brake pedal) BP is a member operated by the driver to decelerate the vehicle. The braking operation member BP is fixed to a vehicle body BD in a state in which rotational movement is possible. An operation displacement sensor SBP is provided at a fixed portion between the braking operation member BP and the vehicle body BD. The operation displacement sensor SBP detects an operation displacement Sbp. The braking torque of the wheels WH (i.e., each of the wheels WHfr, WHfl, WHrr, WHrl) is adjusted, and a braking force is generated on the wheels WH as the braking operation member BP is operated.

Specifically, a rotating member (e.g., brake disc) KT is fixed to the wheel WH of the vehicle. The caliper CP is disposed so as to sandwich the rotating member KT (KTfr, KTfl, KTrr, KTrl). The wheel cylinders WC (i.e., wheel cylinders WCfr, WCfl, WCrr, WCrl) are provided on the calipers CP (i.e., CPfr, CPfl, CPrr, CPrl). As the pressure (fluid pressure) of the braking fluid in the wheel cylinder WC is increased, the friction member (e.g., brake pad) is pressed against the rotating member KT. Since the rotating member KT and the wheel WH are fixed to rotate integrally, the frictional force generated at this time generates a braking torque (as a result, braking force) on the wheel WH.

The operation amount sensor BPA is provided on the braking operation member BP. The operation amount sensor BPA acquires (detects) an operation amount (braking operation amount) Bpa of the braking operation member BP by the driver. Specifically, at least one of the "operation displacement sensor SBP for detecting the operation displacement Sbp of the braking operation member BP" and the "operation force sensor FBP for detecting the operation force Fbp of the braking operation member BP" is adopted as the operation amount sensor BPA.

That is, the operation amount sensor BPA is a general term for the operation displacement sensor SBP and the operation force sensor FBP. Therefore, the braking operation amount Bpa is determined based on at least one of the operation displacement Sbp of the braking operation member BP and the operation force Fbp of the braking operation member BP. The braking operation amount Bpa is input to the electronic control unit (controller) ECU.

<<Braking Actuator BAC>>

The braking actuator BAC independently controls the relationship between the operation force Fbp acting on the braking operation member BP (i.e., force acting on input rod RDI) and the piston displacement of the master cylinder MC (i.e. displacement Sro of output rod RDO). The actuator BAC includes a housing HSG, a first electric motor MTF, a second electric motor MTS, an input rod RDI, an output rod RDO, and a differential mechanism DFR.

The housing HSG is a box-shaped member having a space inside, and is also referred to as a "case (container)". Inside the housing HSG, members constituting the actuator BAC, such as the differential mechanism DFR, are accommodated. The housing HSG is fixed to the vehicle body BD of the vehicle by a mounting bolt BLT and a nut NUT. The master cylinder MC is fixed to the housing HSG on a side opposite to the fixing portion with respect to the vehicle body BD.

Inside the housing HSG, a first electric motor MTF and a second electric motor MTS are fixed. The first electric motor MTF and the second electric motor MTS are separate electric motors. Thus, the housing HSG incorporates two electric motors MTF, MTS. The output (first rotation shaft Shf) of the first electric motor MTF and the output (second rotation shaft Shs) of the second electric motor MTS are input to the differential mechanism DFR.

The input rod RDI is mechanically connected to the braking operation member BP by way of a connecting rod RDC. Specifically, the connecting rod RDC is mechanically connected to the braking operation member BP, and the connecting rod RDC and the input rod RDI are mechanically connected. The braking operation member BP (brake pedal) performs rotational movement with the mounting portion to the vehicle body BD as a center, but the rotational movement is absorbed by the connecting rod RDC and converted to linear movement (forward or backward) of the input rod RDI.

An operation force sensor FBP is provided on the mounting portion (connection portion) between the connecting rod RDC and the braking operation member BP. The operation force sensor FBP detects the operation force Fbp. The input rod RDI is assembled to the housing HSG so as to be linearly movable in the direction of a central axis Jin. The central axis Jin is also referred to as an "input axis". The input rod RDI is input to the differential mechanism DFR at a part opposite to the mounting portion of the input rod RDI and the braking operation member BP.

Similar to the input rod RDI, the output rod RDO is assembled to the housing HSG so as to be linearly movable in the direction of a central axis Jot. The output rod RDO is an output member of the actuator BAC, and presses the piston PNA in the master cylinder MC at its end.

The input and output rods RDI, RDO are two different rod members and are assembled to the housing HSG in a manner that they can move relative to one another. In a geometrical relationship, the central axis Jin of the input rod RDI and the central axis Jot of the output rod RDO are parallel and separated by a distance greater than "0 (zero)". That is, the axis Jin and the axis Jot are different axes and not coaxial. Furthermore, the output rod RDO, the cylinder inner wall of the master cylinder MC, the first piston PNA, and the second piston PNB are coaxially arranged. Therefore, the central axis of these members is the axis Jot. The central axis Jot is also referred to as an "output axis".

The output of the first electric motor MTF and the output of the second electric motor MTS are individually controlled by the differential mechanism DFR. Thus, the force acting on the input rod RDI (i.e., operation force of braking operation member BP) Fbp and the displacement of the output rod RDO (i.e., displacement of piston PNA) Sro are adjusted independently. Here, the outputs of the first and second electric motors MTF and MTS (denoted as "MT" as a general term) refer to the rotating directions (forward rotation or reverse rotation) and the magnitude of the torque of the respective electric motors.

The differential mechanism DFR is incorporated in the housing HSG. The differential mechanism DFR allows relative movement between the input rod RDI and the output rod RDO (i.e., relative movement is adjustable). The outputs of the first and second electric motors MTF and MTS are input to the differential mechanism DFR. Then, a force (an assisting force Fjs to be described later) is applied to the input rod RDI by the first electric motor MTF through the differential mechanism DFR. Furthermore, the displacement Sro of the output rod RDO is controlled (adjusted) by the second electric motor MTS through the differential mechanism DFR. Therefore, the differential mechanism DFR is a power transmission mechanism of two inputs (three inputs if the input rod RDI and the first electric motor MTF are separate inputs) and one output. Details of the differential mechanism DFR will be described later.

The electronic control unit (controller) ECU controls the first and second electric motors MTF and MTS based on the operation amount Bpa (general term of operation displacement Sbp etc.). Specifically, the microprocessor MPR of the controller ECU is programmed with a control algorithm for controlling the two electric motors MT (general term of first and second electric motors MTF and MTS), and a signal for controlling the electric motor MT is calculated. Furthermore, in the controller ECU, a first drive circuit DRF for driving the first electric motor MTF and a second drive circuit DRS for driving the second electric motor MTS are provided. The first and second drive circuits DRF and DRS (denoted as "DR" in general term) are electric circuits formed of a plurality of switching elements, and are controlled by the microprocessor MPR.

The controller ECU independently controls the relationship between the force Fbp acting on the input rod RDI and the displacement Sro of the output rod RDO (as a result, piston displacement in master cylinder) by controlling the electric motor MT. That is, the relationship between the operation characteristic of the braking operation member BP (relationship between operation displacement Sbp and operation force Fbp) and the friction braking force can be arbitrarily set. For example, when the drive motor MTD generates the regenerative braking force Rga (i.e., when the drive motor MTD functions as power generator), the controller ECU controls the output of the first electric motor MTF and the output of the second electric motor MTS to increase the force Fbp acting on the input rod RDI accompanying the increase in the displacement Sbp of the input rod RDI (i.e., increase in operation amount Bpa) and maintain the displacement Sro of the output rod RDO in the zero state. Such a control is called "regenerative coordination control". According to the regenerative coordination control, the power regenerated by the drive motor MTD is sufficiently ensured and the operation characteristic of the braking operation member BP can be optimized. The actuator BAC has been described above.

The master cylinder MC is mechanically connected to output rod RDO. Two first and second fluid paths (braking piping) HKA and HKB (also simply denoted as "HK") are fluidly connected to master cylinder MC. When the braking operation member BP is operated, the braking fluid (brake fluid) is discharged (pressure fed) from the master cylinder MC to the fluid path HK, and the braking fluid in the four wheel cylinders WC is pressurized. The braking fluid is fully filled in the structural members from the master cylinder MC to the wheel cylinder WC thus forming a fluid tight state.

In the master cylinder MC, two first and second fluid pressure chambers Kma and Kmb are formed by the inner wall and the two pistons PNA and PNB. The master cylinder MC is a so-called tandem master cylinder. In the configuration of a diagonal type fluid path, the first fluid pressure chamber Kma of the master cylinder MC is fluidly connected to the wheel cylinders WCfr and WCrl through the first fluid path HKA. Furthermore, the second fluid pressure chamber Kmb of the master cylinder MC is fluidly connected to the wheel cylinders WCfl and WCrr through the second fluid path HKB. The configuration related to the first fluid pressure chamber Kma and the configuration related to the second fluid pressure chamber Kmb are basically the same.

The first and second pistons PNA and PNB are pressed against the output rod RDO by two elastic members (e.g., compression springs) PSA and PSB. Specifically, the second piston spring PSB is provided by being compressed between an inner cylinder bottom portion of the master cylinder MC and the second piston PNB, and the first piston spring PSA is provided by being compressed between the second piston PNB and the first piston PNA. Therefore, the output rod RDO and the first piston PNA can be separated. However, since it is pressed against the output rod RDO by the first and second piston springs PSA and PSB, they are moved integrally at the time of braking.

When the braking operation member BP is operated, the input rod RDI is moved in the forward direction Hff. When the regenerative coordination control is not executed, the output rod RDO is moved in the forward direction Hfp with the forward movement of the input rod RDI, and the first and second pistons PNA, PNB are pressed by the output rod RDO. When the first and second pistons PNA and PNB are moved in the forward direction Hfp, the fluid path to the reservoir RSV is blocked by the first and second pistons PNA and PNB. Furthermore, when the first and second pistons PNA and PNB are moved forward, the volumes of the first and second fluid pressure chambers Kma and Kmb are reduced, and the fluid pressure Pwa in the four wheel cylinders WC is increased.

When the braking operation member BP is returned toward the initial position (position corresponding to time of non-braking), the input rod RDI is moved in the backward direction Hrf. When the regenerative coordination control is not executed, the output rod RDO is moved in the backward direction Hrp with the backward movement of the input rod RDI, and the first and second pistons PNA, PNB are pressed in the backward direction Hrp by the first and second piston springs PSA, PSB. Therefore, the first and second pistons PNA and PNB are moved backward, and the volumes of the first and second fluid pressure chambers Kma and Kmb are increased. As a result, the braking fluid is returned to the master cylinder MC, and the fluid pressure Pwa in the four wheel cylinders WC is reduced.

In the movement along the input axis Jin of the input rod RDI, the "forward direction Hff (left direction in the drawing)" is a direction in which the wheel cylinder fluid pressure Pwa (i.e., braking torque of wheel WH) increases. The forward direction Hff is also the direction in which the operation amount Bpa of the braking operation member BP increases. Conversely, the "backward direction Hrf (right direction in the drawing)" of the input rod RDI is a direction in which the wheel cylinder fluid pressure Pwa (i.e., braking torque of wheel WH) decreases. Furthermore, the backward direction Hrf is also a direction in which the operation amount Bpa of the braking operation member BP decreases.

In the movement along the output axis Jot of the output rod RDO and the first and second pistons PNA and PNB, the "forward direction Hfp (left direction in the drawing)" is a direction in which the volumes of the first and second fluid pressure chambers Kma and Kmb decrease, and the braking fluid is pressure fed from the master cylinder MC. Therefore, the movement of the first and second pistons PNA, PNB in the forward direction Hfp is a direction in which the wheel cylinder fluid pressure Pwa (i.e., braking torque of wheel WH) increases.

On the other hand, the "backward direction Hrp (right direction in the drawing)" of the output rod RDO and the first and second pistons PNA and PNB is a direction in which the volumes of the first and second fluid pressure chambers Kma and Kmb increase, and the braking fluid is absorbed by the master cylinder MC. Therefore, the movement of the first and second pistons PNA, PNB in the backward direction Hrp is a direction in which the wheel cylinder fluid pressure Pwa (i.e., braking torque of wheel WH) decreases.

The first and second fluid pressure sensors PMA and PMB are provided to detect the fluid pressure Pma and Pmb of the first and second fluid pressure chambers Kma and Kmb (as a result, fluid pressure Pwa in wheel cylinder WC). The first and second fluid pressures Pma and Pmb are input to the electronic control unit ECU.

<Driving Process of Electric Motor MTF, MTS>

Figure 2:
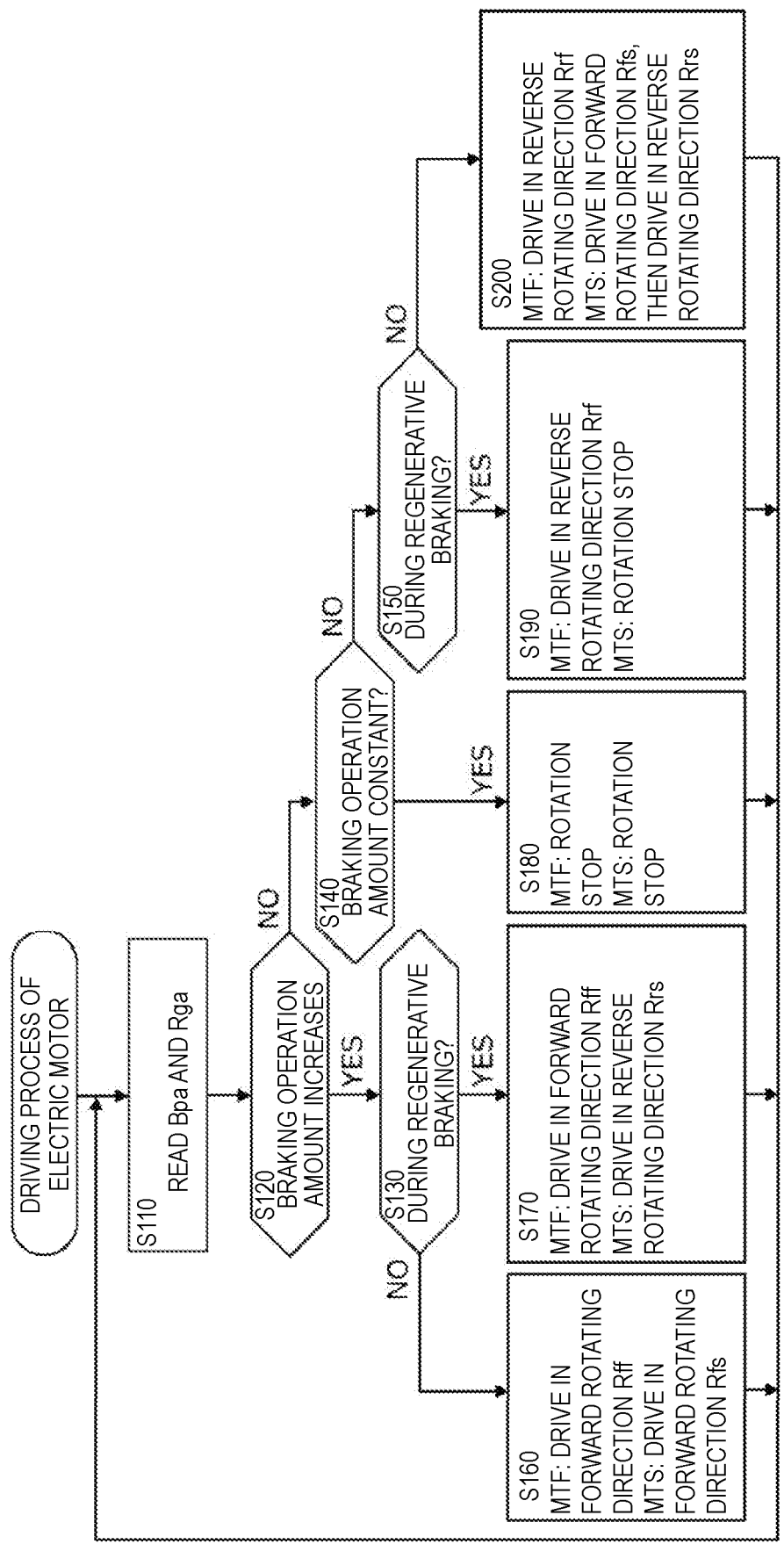
FIG. 2 is a control flow chart for explaining a driving process of an electric motor MTF, MTS.

An example of a driving process of the first and second electric motors MTF and MTS will be described with reference to a control flowchart of FIG. 2. In the actuator BAC, the outputs of the two electric motors MTF and MTS input to the differential mechanism DFR are adjusted, so that the force Fbp acting on the input rod RDI (i.e., operation force Fbp of braking operation member BP) and the displacement Sro of the output rod RDO (i.e., operation displacement Sbp of braking operation member BP) are controlled independently.

First, in step S110, the braking operation amount Bpa and the regenerative braking force (actual value) Rga are read. In step S120, "whether or not the operation amount Bpa is increasing" is determined based on the braking operation amount Bpa. When the operation amount Bpa is increasing and an affirmative determination is made in step S120 (case of "YES"), the process proceeds to step S130. On the other hand, when a negative determination is made in step S120 (case of "NO"), the process proceeds to step S140.

In step S130, "whether or not the regenerative braking is being carried out" is determined based on the regenerative braking force Rga. When the regenerative braking in which the regenerative braking force Rga is being generated is being carried out and an affirmative determination is made in step S130 (case of "YES"), the process proceeds to step S170. On the other hand, when a negative determination is made in step S130 (case of "NO"), the process proceeds to step S160.

In step S140, "whether or not the operation amount Bpa is constant" is determined based on the braking operation amount Bpa. When the braking operation member BP is held and an affirmative determination is made in step S140 (case of "YES"), the process proceeds to step S180. On the other hand, when the operation amount Bpa is decreasing and a negative determination is made in step S140 (case of "NO"), it progresses to step S150.

In step S150, "whether or not the regenerative braking is being carried out" is determined based on the regenerative braking force Rga. When the regenerative braking force Rga is being generated and an affirmative determination is made in step S150 (case of "YES"), the process proceeds to step S190. On the other hand, when a negative determination is made in step S150 (case of "NO"), the process proceeds to step S200.

When the operation amount Bpa is increased and the regenerative braking force Rga is not generated, in step S160, the first electric motor MTF and the second electric motor MTS are both driven in the forward rotating directions Rff and Rfs. Therefore, the output rod RDO (as a result, piston PNA) is moved in the forward direction Hfp by the first electric motor MTF and the second electric motor MTS, and as a result, a friction braking force is generated.

When the operation amount Bpa is increased and the regenerative braking force Rga is generated, in step S170, the first electric motor MTF is driven in the forward rotating direction Rff and the second electric motor MTS is driven in the reverse rotating direction Rrs. Therefore, the movement of the first electric motor MTF is suppressed (partially or completely canceled) by the second electric motor MTS, whereby the output rod RDO (as a result, first and second pistons PNA, PNB) is slightly moved in the forward direction Hfp, or maintained in the movement stop state (holding state). As a result, the friction braking force by the friction member MSB is slightly generated or not generated.

When the braking operation member BP is held and the operation amount Bpa is maintained constant, in step S180, the first electric motor MTF and the second electric motor MTS are both in a stopped state. Thus, the output rod RDO (as a result, piston PNA, PNB) is not moved. When the regenerative braking force is still generated although the operation amount Bpa is decreased, in step S190, the first electric motor MTF is driven in the reverse rotating direction Rrf and the rotation of the second electric motor MTS is stopped.

When the operation amount Bpa is decreased and the regenerative braking force is not generated, in step S200, the first electric motor MTF is driven in the reverse rotating direction Rrf. At this time, the second electric motor MTS is driven in the forward rotating direction Rfs by the amount driven in the reverse rotating direction Rrs in step S170, and then driven in the reverse rotating direction Rrs.

When the first electric motor MTF is driven in the forward rotating direction Rff, an assisting portion Pjs of a first rack RKF receives the force in the forward direction Hff. Conversely, when the first electric motor MTF is driven in the reverse rotating direction Rrf, the assisting portion Pjs of the first rack RKF receives the force in the backward direction Hrf. Furthermore, when the second electric motor MTS is driven in the forward rotating direction Rfs, the second rack RKS receives a force in the forward direction Hfs. Conversely, when the second electric motor MTS is driven in the reverse rotating direction Rrs, the second rack RKS receives a force in the backward direction Hrs.

The processes of step S170 and step S200 correspond to the regenerative coordination control described above. In the regenerative coordination control, the output of the first electric motor MTF and the output of the second electric motor MTS are adjusted, so that the input rod RDI and the output rod RDO are independently controlled without mutually depending on each other in the "relation between force and displacement".

As a result, in the braking operation member BP, the characteristics (operation characteristics) of the operation force Fbp with respect to the operation displacement Sbp are always maintained at appropriate characteristics. Thus, even in a case where three states of "generation only of regenerative braking force", "generation by coordination of regenerative braking force and friction braking force", and "generation only of friction braking force" are transitioned, smooth operation characteristics can be ensured without sudden changes in the operation characteristics at each state transition.

For example, when the drive motor (power generator) MTD generates the regenerative braking force Rga (Rga>0), "state in which the displacement of the input rod RDI (i.e., operation displacement Sbp of braking operation member BP) increases, and the force acting on input rod RDI (i.e., operation force Fbp of braking operation member BP) is increased", and "state in which the displacement Sro of the output rod RDO (i.e., displacement of piston PNA) is in a zero state (i.e., state in which friction braking force is not generated)" can be achieved.

Therefore, the coordination between the regenerative braking force and the friction braking force (respective contribution degree in the braking force in the entire vehicle) is appropriately adjusted in a state where the operation characteristic of the braking operation member BP (relationship of operation force Fbp with respect to operation displacement Sbp) is appropriately maintained. As a result, the regenerative braking force is effectively used, and hence the kinetic energy at the time of vehicle deceleration can be efficiently collected. That is, the regenerable power can be maximized, and the characteristic (operation characteristic) of the operation force Fbp with respect to the operation displacement Sbp can be suitably maintained.

In the example of the driving process of the first and second electric motors MTF and MTS described above, the actual value Rga of the regenerative braking force is adopted. In place of this, a target value Rgt of the regenerative braking force calculated in the controller ECD for driving may be adopted. In any case, the regenerative coordination control is executed according to the braking operation amount Bpa based on the presence or absence of the regenerative braking force.

<Differential Mechanism DFR>

Figure 3:
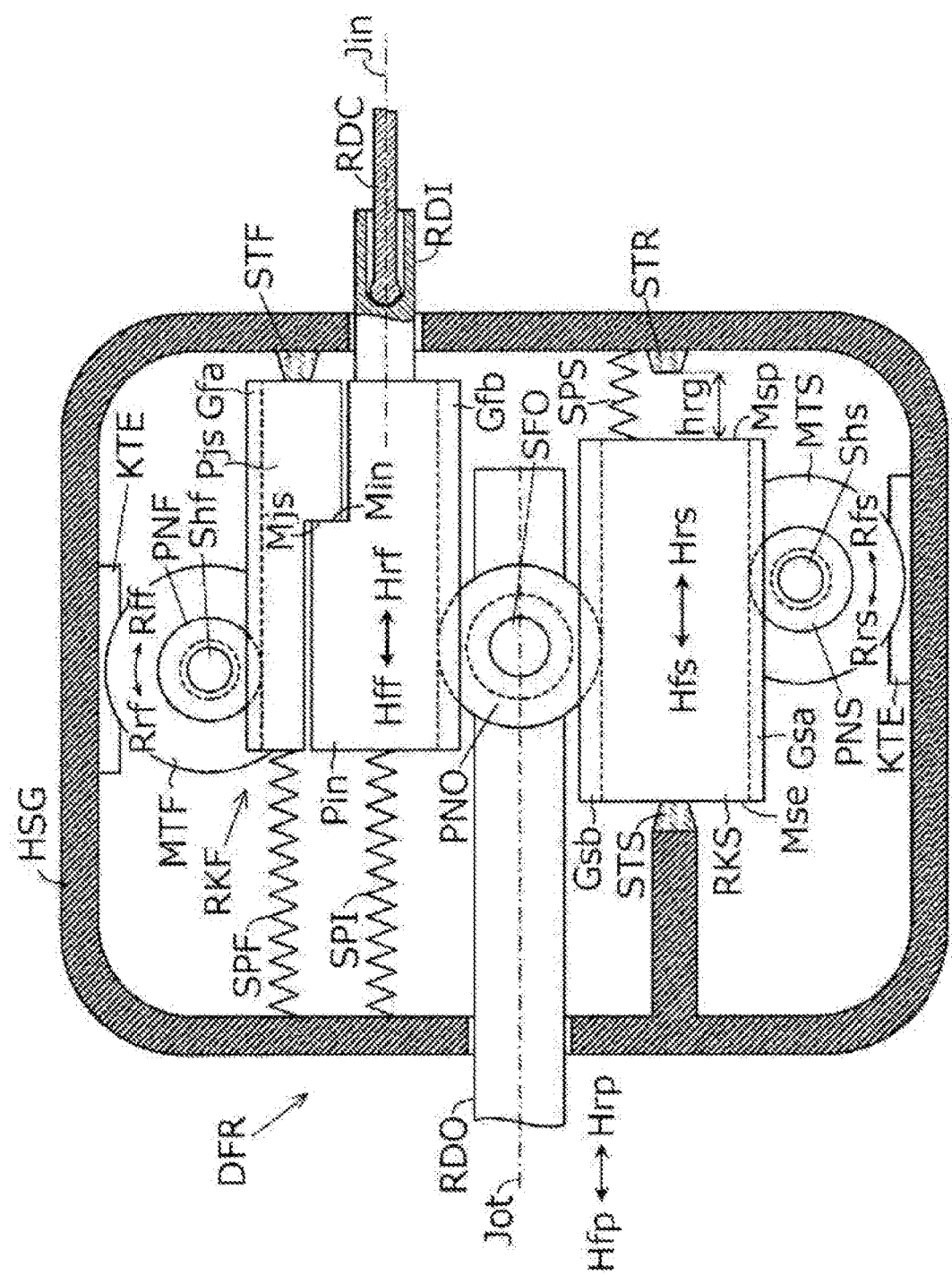
FIG. 3 is a schematic view describing a first embodiment of a differential mechanism DFR of a braking actuator BAC.

The configuration and operation of the first embodiment of the differential mechanism DFR provided in the actuator BAC will be described in detail with reference to a conceptual view of FIG. 3. Since the differential mechanism DFR is adopted for the braking actuator BAC, the force and the displacement are separated by the first and second electric motors MTF and MTS, and are independently controlled separately. Thus, the braking control device capable of regenerative coordination control can be configured with one master cylinder MC without adopting two master cylinders as in Patent Literature 1.

<<Configuration of Differential Mechanism DFR>>

First, the configuration of the differential mechanism DFR will be described. The differential mechanism DFR is formed by a rack and pinion mechanism (conversion mechanism between rotational movement and linear movement). In the rack-and-pinion mechanism, "a circular gear called a pinion gear" and "a rack in which teeth (rack gear) are provided so as to engage with a pinion gear on a flat plate shaped rod" are combined. The differential mechanism DFR is configured to include "first and second pinion gears PNF and PNS", "first and second racks RKF and RKS", "input and output rods RDI and RDO", and an output pinion gear PNO. Here, the "first and second pinion gears PNF and PNS", "first and second racks RKF and RKS", and the output pinion gear PNO correspond to the "transmission mechanism" of transmitting the outputs (power) of the "first and second electric motors MTF and MTS".

The differential mechanism DFR is configured by three transmission mechanisms. The "first transmission mechanism" transmits the output of the first electric motor MTF to the input rod RDI. Specifically, a combination of the first pinion gear PNF and a first input rack gear portion Gfa of the first rack RKF (rack and pinion mechanism) described below corresponds to the first transmission mechanism. The "second transmission mechanism" transmits the output of the second electric motor MTS to the output rod RDO. A combination of the second pinion gear PNS and a second input rack gear portion Gsa of the second rack RKS, and a combination of the output pinion PNO and a second output rack gear portion Gsb of the second rack RKS correspond to the second transmission mechanism. The "third transmission mechanism" transmits the output of the input rod RDI to the output rod RDO. A combination of the output pinion gear PNO and a first output rack gear portion Gfb of the second rack RKF corresponds to the third transmission mechanism. The differential mechanism DFR adjusts the relative movement between the input rod RDI and the output rod RDO.

The first and second electric motors MTF and MTS are fixed inside the housing HSG by a fixing member KTE. The first pinion gear PNF is fixed to the output shaft portion Shf of the first electric motor MTF. Similarly, the second pinion gear PNS is fixed to the output shaft portion Shs of the second electric motor MTS. A reduction gear may be provided in at least one of between the rotation shaft (first rotation shaft) Shf of the first electric motor MTF and the first pinion gear PNF, and between the rotation shaft (second rotation shaft) Shs of the second electric motor MTS and the second pinion gear PNS.

A connecting rod RDC is rotatably connected to the braking operation member BP by a clevis (U-shaped link). In the connecting rod RDC, the opposite side of the clevis portion is processed to a spherical shape and mechanically connected to the input rod RDI. That is, the input rod RDI and the braking operation member BP are mechanically connected through the connecting rod RDC. The braking operation member BP performs rotational movement at the mounting portion of the vehicle body BD, but the rotational movement of the braking operation member BP is effectively converted to the linear movement of the input rod RDI by the connecting rod RDC. A distal end of the input rod RDI (side opposite to the end connected to the braking operation member BP) is fixed to the first rack RKF.

The first rack RKF is smoothly movable along the input axis Jin (central axis of input rod RDI) with respect to the housing HSG. The first rack RKF is configured by two members, an input portion Pin and the assisting portion Pjs. This configuration is called "divided configuration". The input portion Pin and the assisting portion Pjs are formed along the input axis Jin so as to enable mutual displacement. The input rod RDI is fixed and the first output rack gear Gfb is formed on the input portion Pin, and the first output rack gear Gfb is engaged with the output pinion gear PNO. In the assisting portion Pjs, the first input rack gear Gfa is formed separate from the first output rack gear Gfb, and the first input rack gear Gfa is engaged with the first pinion gear PNF. Therefore, the rotational power of the first electric motor MTF is input to the assisting portion Pjs via the first pinion gear PNF. In the first rack RKF, the first output rack gear Gfb is located on the back side of the first input rack gear Gfa (opposite side with input axis Jin in between).

The input rod RDI is fixed to the first rack RKF (in particular, input portion Pin). Therefore, the output of the first electric motor MTF is converted from rotational movement to translational movement (movement in parallel direction) through the power transmission mechanism (first pinion gear PNF, first rack RKF) and transmitted to the input rod RDI.

A step perpendicular to the input axis Jin is provided in the input portion Pin, and a pressure receiving surface Min directed in the backward direction Hrf is formed. Similarly, a step perpendicular to the input axis Jin is provided in the assisting portion Pjs, and an assisting surface Mjs directed in the forward direction Hff is formed. The force Fjs in the forward direction Hff is applied by surface contact between the assisting surface Mjs and the pressure receiving surface Min. Here, the force Fjs acting on the input portion Pin from the assisting portion Pjs is referred to as "assisting force".

The power transmission (i.e., transmission of force) between the input portion Pin and the assisting portion Pjs has directivity. The assisting portion Pjs transmits power to the input portion Pin in the forward direction Hff but does not transmit power in the backward direction Hrf. On the other hand, the input portion Pin transmits power to the assisting portion Pjs in the backward direction Hrf but does not transmit power in the forward direction Hff. In other words, although the force is transmitted in the direction in which the assisting portion Pjs approaches the input portion Pin, the force is not transmitted in the direction in which the assisting portion Pjs separates from the input portion Pin. Therefore, in the first rack RKF, the assisting force Fjs generated by the first electric motor MTF is transmitted in the forward direction Hff but is not transmitted in the backward direction Hrf (opposite direction from forward direction Hff) by the configuration of the input portion Pin and the assisting portion Pjs.

The housing HSG is provided with a first stopper STF so as to inhibit the movement of the first rack RKF in the backward direction Hrf. The assisting portion Pjs of the first rack RKF is pressed in the backward direction Hrf by a first rack elastic body SPF (e.g., compression spring). The first rack elastic body SPF is provided between the housing HSG and an assisting portion second end face Mjp of the assisting portion Pjs, and when the first electric motor MTF is not energized, an assisting portion first end face Mje of the assisting portion Pjs is pressed against the first stopper STF provided in the housing HSG. When the braking operation member BP is not operated by the first rack elastic body SPF (i.e., when "Bpa=0"), the assisting portion first end face Mje is abutted to the first stopper STF.

Similarly, the input portion Pin of the first rack RKF is pressed in the backward direction Hrf by a return elastic body SPI (e.g., compression spring). The return elastic body SPI is provided between the housing HSG and an input portion second end face Mip of the input portion Pin, and in the normal case, the input portion Pin and the assisting portion Pjs are integrally moved. Here, "the normal case" means "when the first electric motor MTF operates properly and its power can be generated", and "when the operation of the braking operation member BP is not sudden, and the response of the first electric motor MTF can sufficiently follow the operation".

Similar to the first rack RKF, two rack gears Gsa and Gsb are formed in the second rack RKS. The output pinion gear PNO is engaged with the first output rack gear Gfb of the first rack RKF, and is also engaged with the second output rack gear Gsb of the second rack RKS. In the second rack RKS, a second input rack gear Gsa is formed on the back side of the second output rack gear Gsb separately from the second output rack gear Gsb. The second input rack gear Gsa is engaged with the second pinion gear PNS. Therefore, the output of the second electric motor MTS is converted from rotational movement to translational movement through the power transmission mechanism (second pinion gear PNS, second rack RKS, output pinion gear PNO) and transmitted to the output rod RDO.

The housing HSG is provided with a second stopper STS so as to inhibit the movement of the second rack RKS in the forward direction Hfs. The second rack RKS is pressed in the forward direction Hfs by a second rack elastic body SPS (e.g., compression spring). A second rack elastic body SPS is provided between the housing HSG and a first end face Msp of the second rack RKS. When the braking operation member BP is not operated (i.e., when "Bpa=0"), a second end face Mse of the second rack RKS is pressed against and abutted to the second stopper STS provided in the housing HSG by the second rack elastic body SPS. Therefore, this position is the initial position of the second rack RKS corresponding to the state in which the braking operation member BP is not operated. Furthermore, when the second electric motor MTS is not energized, the second rack RKS is moved in the forward direction Hfs by the second rack elastic body SPS, and the second end face Mse is pressed against the second stopper STS.

A regenerative stopper STR is provided in the housing HSG on a side opposite to the second stopper STS with respect to the second rack RKS so as to inhibit the movement of the second rack RKS in the backward direction Hrs. The movement of the second rack RKS is limited to a predetermined displacement hrg by the second stopper STS and the regenerative stopper STR. That is, the range in which the second rack RKS can move is from the initial position (abutting position with second stopper STS corresponding to time of non-braking) to the predetermined displacement hrg. The movement of the second rack RKS in the backward direction Hrs corresponds to regenerative coordination control so as not to generate a friction braking force. For example, it can be set in advance as a value corresponding to a vehicle deceleration (e.g., from 0.2 to 0.3 G) generable by the electric driving device EDS (i.e., regenerative braking device). Here, the generable vehicle deceleration in the regenerative braking device EDS is determined based on the capacity of the power generator MTD, the energization amount of the controller ECD, and the like. Even when the controller ECU or the second electric motor MTS malfunctions by the displacement limitation hrg, the friction braking force can be reliably generated with the operation of the braking operation member BP.

The output pinion gear PNO is rotatably fixed to the output rod RDO by the rotating shaft SFO. The output rod RDO is smoothly movable along the output axis Jot (central axis of output rod RDO) with respect to the housing HSG. The central axis Jin and the central axis Jot are separate parallel axes, and are referred to as "separate axis configuration". The first and second racks RKF, RKS, and the output rod RDO is smoothly movable along the central axis Jin (central axis Jot) with respect to the housing HSG. That is, in the differential mechanism DFR, the first and second racks RKF, RKS, and the output rod RDO can be relatively moved in parallel and linearly to each other (in other words, relative movement is allowed).

When a tandem type master cylinder is adopted as master cylinder MC, two fluid pressure chambers Kma and Kmb are arranged in series. Thus, the dimension in the central axial direction Jot of the master cylinder MC becomes long. However, since the differential mechanism DFR having the separate axis configuration is adopted, the axial dimension is shortened and the structure is simplified. As a result, miniaturization of the entire device can be achieved. The configuration of the differential mechanism DFR has been described above.

<<Operation of Differential Mechanism DFR>>

Next, the operation of the differential mechanism DFR will be described. As described above, in the movement of each element (first rack RKF, etc.) configuring the differential mechanism DFR, the movement in the "forward direction Hff, Hfs, Hfp" corresponds to an increase in the fluid pressure Pwa of the wheel cylinder WC. The linear movement in the forward direction corresponds to the rotational movement in the "forward rotating directions Rff, Rfs" of the first and second electric motors MTF, MTS. The movement in the "backward direction Hrf, Hrs, Hrp", which is the direction opposite to the forward direction Hff, Hfs, Hfp, corresponds to a decrease in the fluid pressure Pwa of the wheel cylinder WC. The linear movement in the backward direction corresponds to the rotational movement in the "reverse rotating direction Rrf, Rrs" of the first and second electric motors MTF, MTS.

When the braking operation amount Bpa is increased and the input rod RDI is moved in the forward direction Hff (corresponding to increase in operation amount Bpa), the first electric motor MTF is driven in the forward rotating direction Rff. Thus, the rotational power of the first electric motor MTF is transmitted to the assisting portion Pjs of the first rack RKF through the first pinion gear PNF. Since the power from the assisting portion Pjs to the input portion Pin is transmitted in the forward direction Hff, the assisting portion Pjs presses the input portion Pin in the forward direction Hff.

The assisting force Fjs is generated by the output of the first electric motor MTF being transmitted to the input rod RDI by the transmission mechanism (first pinion gear PNF, first rack RKF). The operation of the braking operation member BP by the driver is assisted by the assisting force Fjs, and the operation force Fbp of the braking operation member BP is reduced. That is, the boosting function can be achieved by the first electric motor MTF, the first pinion gear PNF, and the first rack RKF.

The movement of the input rod RDI in the forward direction Hff is transmitted to the output rod RDO through the input portion Pin of the first rack RKF and the output pinion gear PNO. Thus, the output rod RDO also tends to be moved in the forward direction Hfp. However, the movement of the output rod RDO depends on the movement (displacement) of the second rack RKS driven by the second electric motor MTS.

When the driving electric motor (power generator) MTD generates the regenerative braking force Rga and the regenerative braking force Rga is enough for deceleration of the vehicle, the friction braking force does not need to be generated. Therefore, even if the input rod RDI is moved in the forward direction Hff by the braking operation member BP, the output rod RDO is not moved the forward direction Hfp and the generation of the braking fluid pressure is prevented. Specifically, the second electric motor MTS is driven in the reverse rotating direction Rrs, and the second rack RKS is moved in the backward direction Hrs. As a result, the power transmission from the first rack RKF is canceled out, and hence the occurrence of the displacement of the output rod RDO can be avoided, and sufficient energy regeneration can be performed by the drive motor (power generator) MTD.

In a case where the rotational speed of the wheel WH is decreased and the regenerative braking force is insufficient for the required deceleration of the vehicle, the friction braking force (i.e., increase in braking fluid pressure Pwa) becomes necessary. In this case, the second electric motor MTS is stopped or driven in the forward rotating direction Rfs, and the second rack RKS is stopped or moved in the forward direction Hfs. The output rod RDO is thereby moved in the forward direction Hfp, and the regenerative braking force and the friction braking force can be controlled in coordination. Furthermore, when the regenerative braking force is not generated, the second electric motor MTS is driven in the forward rotating direction Rfs, the output rod RDO is moved in the forward direction Hfp, and the friction braking force is increased according to the braking operation amount Bpa.

If the first electric motor MTF or the first drive circuit DRF is malfunctioning, the first electric motor MTF is not energized. Specifically, in the controller ECU, the signals of the respective sensors (e.g., rotation angle of first electric motor MTF, current value of first drive circuit DRF) are taken into consideration, and the malfunction state of at least one of the first electric motor MTF and the first drive circuit DRF is determined. The first electric motor MTF is energized if the malfunction state is not determined (i.e., if first electric motor MTF and first drive circuit DRF are operating properly), and the energization of the first electric motor MTF is stopped if the malfunction state is determined. Therefore, in the malfunction state, the rotational power is not generated by the first electric motor MTF, and the assisting force Fjs is not generated.

When the braking operation member BP is operated and the input rod RDI is moved in the forward direction Hff in the above-mentioned malfunction state, since the input portion Pin does not exert a force on the assisting portion Pjs due to the divided configuration, the assisting portion Pjs is not moved, and only the input portion Pin is moved in the forward direction Hff. In this case, the assisting portion Pjs remains at a position abutting to the first stopper STF as it is pressed by the first rack elastic body SPF.

When the first rack RKF has an integral structure, the first electric motor MTF is rotated by the movement of the first rack RKF with the movement of the input rod RDI. Therefore, the operation force Fbp of the braking operation member BP is increased by the amount by which the first electric motor MTF is rotated. That is, the first electric motor MTF becomes a resistance of the braking operation. In order to solve this problem, the divided configuration "of being divided into two members Pin and Pjs, and the power transmission between the input portion Pin and the assisting portion Pjs is achieved only in the forward direction Hff from the assisting portion Pjs to the input portion Pin and the backward direction Hrf from the input portion Pin to the assisting portion Pjs" is adopted for the first rack RKF. In other words, in the divided configuration, power is not transmitted in the backward direction Hrf from the assisting portion Pjs to the input portion Pin and in the forward direction Hff from the input portion Pin to the assisting portion Pjs. As a result, at the time of malfunctioning of the first electric motor MTF or the like, the operation force Fbp can be suppressed from becoming unnecessarily increased.

The divided configuration of the first rack RKF described above is effective even when the braking operation member BP is operated rapidly. The output response of the first electric motor MTF is limited. When the braking operation member BP is operated extremely quickly, the response of the first electric motor MTF may not be in time, and the first electric motor MTF may become a resistance in the braking operation. When the first electric motor MTF is designed to respond even to such a situation, the first electric motor MTF becomes very large. However, since the first rack RKF adopts the divided configuration, the first electric motor MTF does not become a resistance even when the braking operation member BP is operated at a very high speed, so that the suitable braking operation characteristic can be ensured.

When the braking operation member BP is returned and the input rod RDI is moved in the backward direction Hrf (corresponding to decrease in operation amount Bpa), the first electric motor MTF is driven in the reverse rotating direction Rrf. Furthermore, the assisting portion Pjs is pressed in the backward direction Hrf by the first rack elastic body SPF, and the input portion Pin is pressed in the backward direction Hrf by the return elastic body SPI. If a malfunction occurs in the second electric motor MTS or the like while the braking operation member BP is being returned, the input portion Pin and the assisting portion Pjs are moved in the backward direction Hrf by the return elastic body SPI and the first rack elastic body SPF. Even in a malfunction state, the first rack RKF is reliably returned to the position at the time of non-braking (also referred to as "initial position") where "the input portion Pin makes contacts with the first stopper STF and the input portion Pin abuts against the assisting portion Pjs".

If the movement of the second rack RKS is locked, when the input portion Pin of the first rack RKF is moved in the forward direction Hff, the output rod RDO is moved in the forward direction Hfp along the output axis Jot through the output pinion gear PNO. The fluid pressures Pma and Pmb are thereby generated in the master cylinder MC. When the second electric motor MTS is driven in the reverse rotating direction Rrs and the second rack RKS is moved in the backward direction Hrs while the input portion Pin is moved in the forward direction Hff, the rotation of the output pinion gear PNO by the first output rack gear portion Gfb is absorbed by the movement of the second output rack gear portion Gsb, and hence the amount of movement of the output rod RDO in the forward direction Hfp becomes smaller than the amount of movement of the second rack RKS at the time of locking. For example, when the moving speed in the forward direction Hff of the input portion Pin (i.e., first output rack gear portion Gfb) and the moving speed in the backward direction Hrs of the second rack RKS (i.e., second output rack gear portion Gsb) are the same, an idle state of the output pinion gear PNO (state in which output rod RDO is not moved even if input rod RDI is moved) occurs, and the fluid pressures Pma and Pmb of the master cylinder MC are not generated. As described above, the regenerative coordination control (control in which regenerative braking force and friction braking force are coordinated) can be achieved by the relative movement (displacement) between the first rack RKF (in particular, input portion Pin) and the second rack RKS.

Similarly to the first electric motor MTF, when at least one of the second electric motor MTS and the second drive circuit DRS is in a malfunction state, the second electric motor MTS is not energized. Specifically, in the controller ECU, the signals of the respective sensors (e.g., rotation angle of second electric motor MTS, current value of second drive circuit DRS) are taken into consideration, and the malfunction state of at least one of the second electric motor MTS and the second drive circuit DRS is determined. The second electric motor MTS is energized if the malfunction state is not determined (i.e., if second electric motor MTS and second drive circuit DRS are operating properly), and the energization of the second electric motor MTS is stopped if the malfunction state is determined. Therefore, in the malfunction state, the second electric motor MTS is freely rotated and is not locked, and thus the locked state of the second rack RKS cannot be maintained. Therefore, the amount of movement of the output rod RDO may be becomes smaller than a desired amount, and increase in the fluid pressure Pma, Pmb of the master cylinder MC is prevented.

In order to solve this problem, the movable distance of the second rack RKS is limited to within the range of the predetermined displacement hrg (i.e., range from abutting position with second stopper STS to abutting position with regenerative stopper STR) by the second stopper STS and the regenerative stopper STR. In this case, when the input rod RDI is moved in the forward direction Hff, the second rack RKS is moved in the backward direction Hrs by the output pinion gear PNO. After the second rack RKS abuts to the regenerative stopper STR, the movement of the second rack RKS is restricted, and it is not moved any further. As a result, the second rack RKS is locked, the output rod RDO is moved in the forward direction Hfp, and the fluid pressures Pma and Pmb of the master cylinder MC are increased.

Furthermore, when the braking operation amount Bpa is less than or equal to a predetermined amount bpx, the load at the time of mounting of the second rack elastic body SPS can be set greater than a predetermined load fsx so that a state in which the second rack RKS is abutted to the second stopper STS (initial position of second rack RKS) is maintained even if the second electric motor MTS is not energized. Here, the predetermined load fsx is set based on the spring constant and the mounting height. When the input rod RDI is moved in the forward direction Hff, a force to move the second rack RKS in the backward direction Hrs acts through the output pinion gear PNO. As the elastic force (load at time of mounting) of the second rack elastic body SPS is applied to the second rack RKS so as to oppose such a force, the movement of the second rack RKS is inhibited and a state in which the second rack RKS is abutted to the second stopper STS is maintained.

In the configuration described above, when the input rod RDI is moved in the forward direction Hff, the second rack RKS receives a force in the backward direction Hrs by the output pinion gear PNO. However, since the force in the forward direction Hfs by the second rack elastic body SPS is greater than the force in the backward direction Hrs received from the output pinion gear PNO, the second rack RKS remains in contact with the second stopper STS. As a result, the output rod RDO is moved in the forward direction Hfp, and the fluid pressures Pma and Pmb of the master cylinder MC increase. As the fluid pressures Pma, Pmb of the master cylinder MC gradually increase, the output rod RDO receives a force in the backward direction Hrp from the piston PNA, and the force in the backward direction Hrs of the second rack RKS increases. At a time point the operation amount Bpa reaches the predetermined amount bpx, the force in the backward direction Hrs received from the output pinion gear PNO becomes greater than the force in the forward direction Hfs by the second rack elastic body SPS, and the second rack RKS is moved in the backward direction Hrs. Since the position of the output rod RDO is constant over the distance hrg until the second rack RKS abuts to the regenerative stopper STR, the fluid pressures Pma and Pmb of the master cylinder MC are maintained. Then, after the second rack RKS strikes the regenerative stopper STR, the locked state of the second rack RKS is achieved again, so that the output rod RDO is displaced in the forward direction Hfp and the fluid pressures Pma, Pmb of the master cylinder MC are increased.

For example, the predetermined amount bpx is set as a value corresponding to the deceleration (approximately 0.3 G) of the vehicle generated at the time of general braking. In this case, the contact state between the second rack RKS and the second stopper STS is maintained until the vehicle deceleration reaches the set value (e.g., 0.3 G), and the second rack RKS and the second stopper STS are separated when the deceleration exceeds the set value. Since the predetermined amount bpx is set as a value that is unlikely to occur in a general braking operation, the operation characteristic at the time of malfunctioning of the second electric motor MTS can be satisfactorily ensured.

<Mutual Relationship Between Input Rod Displacement Sri and Braking Fluid Pressure Pwa>

Figure 4:
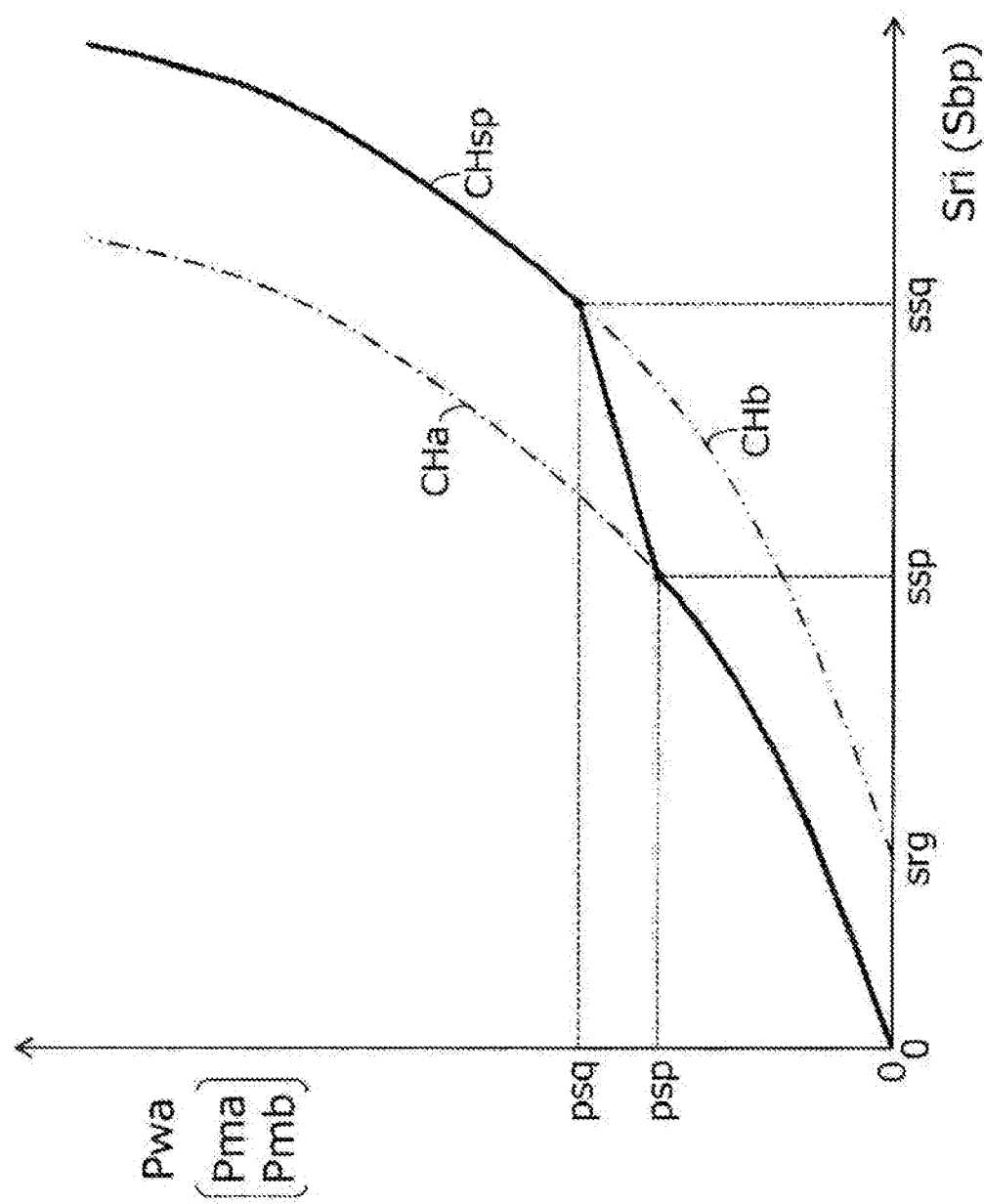
FIG. 4 is a characteristic diagram describing a relationship between a displacement Sri of an input rod RDI and a braking fluid pressure Pwa.

The relationship between the displacement Sri of the input rod RDI and the braking fluid pressure (fluid pressure of wheel cylinder WC) Pwa will be described with reference to the characteristic diagram of FIG. 4. Here, the braking fluid pressure Pwa is equal to the fluid pressures Pma and Pmb of the master cylinder MC detected by the first and second fluid pressure sensors PMA and PMB. Furthermore, the input rod displacement Sri is a value corresponding to the operation displacement Sbp of the braking operation member BP. Therefore, the characteristic diagram represents the relationship of the braking fluid pressure Pwa with respect to the operation amount Bpa of the braking operation member BP.

The characteristic CHa is the relationship of the braking fluid pressure Pwa with respect to the input rod displacement Sri when the second rack RKS is always abutted to the second stopper STS. Due to the rigidity (spring constant) of the friction member MSB, the caliper CP, and the like, in the characteristic CHa, the braking fluid pressure Pwa is increased with the "convex downward" characteristic with respect to the increase of the input rod displacement Sri. The output rod displacement Sro and the braking fluid pressure Pwa correspond one to one.

The characteristic CHb is the relationship between the input rod displacement Sri and the braking fluid pressure Pwa when the second rack elastic body SPS is not adopted. The input rod displacement Sri is increased from "0", but no elastic force is generated by the second rack elastic body SPS, and the second rack RKS is freely movable in the backward direction Hrs, whereby the braking fluid pressure Pwa Is not increased and is remained at "0". Here, "Sri=0" corresponds to "Bpa=0", and is a state in which the second rack RKS is abutted to the second stopper STS.

When the second rack RKS is moved in the backward direction Hrs by a predetermined displacement hrg and abuts to the regenerative stopper STR, the braking fluid pressure Pwa is increased from "0". Here, the displacement srg of the input rod RDI is a value corresponding to the predetermined displacement hrg of the second rack RKS. The items (module, number of teeth, etc.) of the first output rack gear Gfb and the output pinion gear PNO, and the items of the second output rack gear Gsb and the output pinion gear PNO are known. Therefore, the displacement Sri of the input rod RDI and the displacement Sro of the output rod RDO correspond to each other.

When the second rack RKS strikes the regenerative stopper STR, in the characteristic CHb, the braking fluid pressure Pwa is increased with the "convex downward" characteristic according to the increase of the input rod displacement Sri, similar to a case in which the second rack RKS is restrained by the second rack elastic body SPS. The shape of the characteristic CHb is due to the rigidity of the friction member MSB, the caliper CP and the like, and the characteristic CHa parallel displaced by the displacement srg along the input rod displacement Sri corresponds to the characteristic CHb.

The relationship between the displacement Sri of the input rod RDI and the braking fluid pressure Pwa can be controlled in the region sandwiched between the characteristic CHa and the characteristic CHb by controlling the second electric motor MTS. For example, when the regenerative braking force is generated by the power generator MTD, adjustment may be made such that the braking fluid pressure Pwa does not increase even if the input rod displacement Sri is increased by the regenerative coordination control.

For example, if the power supply malfunctions, the second electric motor MTS is not energized and the rotational force of the second electric motor MTS is not generated. Even in this case, a second rack elastic body SPS (e.g., compression spring) that applies a force in the forward direction Hfs is provided with respect to the second rack RKS so that the second rack RKS is not freely moved in the backward direction Hrs. The braking fluid pressure Pwa can be generated according to an increase in the displacement Sri of the input rod RDI even in the case of a power supply failure or the like by the second rack elastic body SPS, and deceleration of the vehicle can be secured.

As described above, the movement of the second rack RKS is limited by the second stopper STS and the regenerative stopper STR. Therefore, even if the second electric motor MTS is not energized, the mutual relationship between the input rod displacement Sri and the braking fluid pressure Pwa is defined within the region sandwiched by the characteristics CHa and CHb. When the second electric motor MTS is not energized, the second rack RKS is pressed in the forward direction Hfs by the second rack elastic body SPS, so that the braking fluid pressure Pwa is increased from "0" to a value psp along the characteristic CHa from "0" to a value ssp of the input rod displacement Sri. When the braking fluid pressure Pwa reaches the value psp, the second rack RKS is moved in the backward direction Hrs as the elastic force (load at the time of mounting) by the second rack elastic body SPS and the force received from the piston PNA are balanced. Here, the value ssp is referred to as "characteristic maintaining displacement", and the value psp is referred to as "characteristic maintaining fluid pressure". When the braking fluid pressure Pwa becomes greater than or equal to the characteristic maintaining fluid pressure psp, the increasing gradient of the braking fluid pressure Pwa is decreased with respect to the characteristic CHa. Then, when the input rod displacement Sri reaches the value ssq (>ssp), the second rack RKS strikes the regenerative stopper STR. Thus, the braking fluid pressure Pwa is increased along the characteristic CHb from the value psq (>psp) with respect to the increase of the input rod displacement Sri. Therefore, when the second electric motor MTS is not energized, the braking fluid pressure Pwa with respect to the input rod displacement Sri (i.e., braking operation amount Bpa) changes with the characteristic CHsp.

The value (characteristic maintaining fluid pressure) psp of the braking fluid pressure Pwa at which the second rack RKS starts to be moved may be set greater than the value corresponding to general braking (normal braking) which is not an emergency braking. That is, the characteristic maintaining fluid pressure psp is set to exceed the value of the braking fluid pressure Pwa used at the time of normal braking. For example, the characteristic maintaining fluid pressure psp is set as a value corresponding to about 0.3 G, which is the deceleration of the vehicle generated at the time of general braking. In this case, the contact state between the second rack RKS and the second stopper STS is maintained by the elastic force of the second rack elastic body SPS until the deceleration of the vehicle becomes greater than 0.3 G.

The characteristic maintaining fluid pressure psp is determined by the characteristics of the second rack elastic body SPS (i.e., spring constant and load at the time of mounting set based on mounting height). The characteristic maintaining displacement ssp and the characteristic maintaining fluid pressure psp are values corresponding to the above-mentioned predetermined amount bpx.

Due to the characteristics of the second rack elastic body SPS, the characteristic maintaining fluid pressure psp is set to a value that is not reached by general braking (normal braking) (i.e., operation amount bpx that is not generated at the time of normal braking). Thus, at the time of power supply failure or the like, discontinuity of the braking fluid pressure Pwa with respect to the increase of the input rod displacement Sri (i.e., the braking operation amount Bpa) hardly occurs. As a result, in the operation characteristic of the braking operation member BP, the uncomfortableness to the driver can be reduced.

Other Embodiments

Hereinafter, other embodiments (modified examples) will be described. In these cases as well, the braking actuator BAC achieves effects similar to above (satisfying both performance of control device and failsafe, ensuring suitable braking operation characteristics at the time of power supply failure, etc.).

In the first embodiment described above, a disk type braking device has been illustrated as a device for applying the braking torque to the rotating member KT (i.e., wheel WH). Instead, a drum type braking device (drum brake) may be adopted. In the case of a drum brake, a brake drum is adopted in place of the caliper CP. The friction member is a brake shoe, and the rotating member KT is a brake drum.

Furthermore, in the first embodiment described above, a diagonal type (also referred to as "X type") has been illustrated as the two system hydraulic circuit (configuration of braking piping). Instead, an anterior-posterior type (also referred to as "H-type") configuration may be adopted. In this case, the first fluid path HKA is fluidly connected to the front wheel wheel cylinders WCfr, WCfl, and the second fluid path HKB is fluidly connected to the rear wheel wheel cylinders WCrr, WCrl.

In the first embodiment described above, an example in which an electric motor for driving is adopted as the power generator MTD has been described. However, that which does not function for driving and which only has a power generating function may be adopted as the power generator MTD. Even in this case, the power generator MTD is mechanically connected to the wheel WH, and kinetic energy of the vehicle is regenerated as power at the time of vehicle deceleration. At this time, regenerative braking force is applied to the wheel WH.

In the first embodiment described above, the three stoppers STF, STS, STR are illustrated as being fixed to the housing HSG. However, the stoppers STF, STS, and STR merely need to be that which can restrain the displacement of the first and second racks RKF, RKS. Therefore, at least one of the stoppers STF, STS, STR can be fixed not to the housing HSG but to another structural member. Even in this case, the stopper can inhibit the movement of the racks RKF, RKS so as not to be displaced.

In the first embodiment described with reference to FIG. 3, the first pinion gear PNF is fixed to the output shaft Shf of the first electric motor MTF, and the second pinion gear PNS is fixed to the rotation shaft Shs of the second electric motor MTS. At least one of the first pinion gear PNF and the second pinion gear PNS can be mechanically connected to the rotation shafts (output shafts) Shf and Shs of the respective electric motors MTF and MTS through a reduction gear. In this case as well, the first pinion gear PNF is mechanically connected to the rotation shaft Shf of the first electric motor MTF, and the second pinion gear PNS is mechanically connected to the rotation shaft Shs of the second electric motor MTS.

In the first embodiment described above, the displacement of the second rack RKS is limited within the range of the predetermined displacement hrg. Alternatively, the movement of the structural member of the second transmission mechanism in the backward direction Hrs may be limited to within the range of the predetermined displacement hrg. The power is transmitted from the second electric motor MTS to the output rod RDO in the order of "PNS→Gsa→Gsb→PNO" by the second transmission mechanism. For example, in the second pinion gear PNS, the rotational displacement in the backward direction Hrs (i.e., reverse rotating direction Rrs) is limited to within the range of the predetermined displacement hrg.

Second Embodiment of Differential Mechanism DFR

Figure 5:
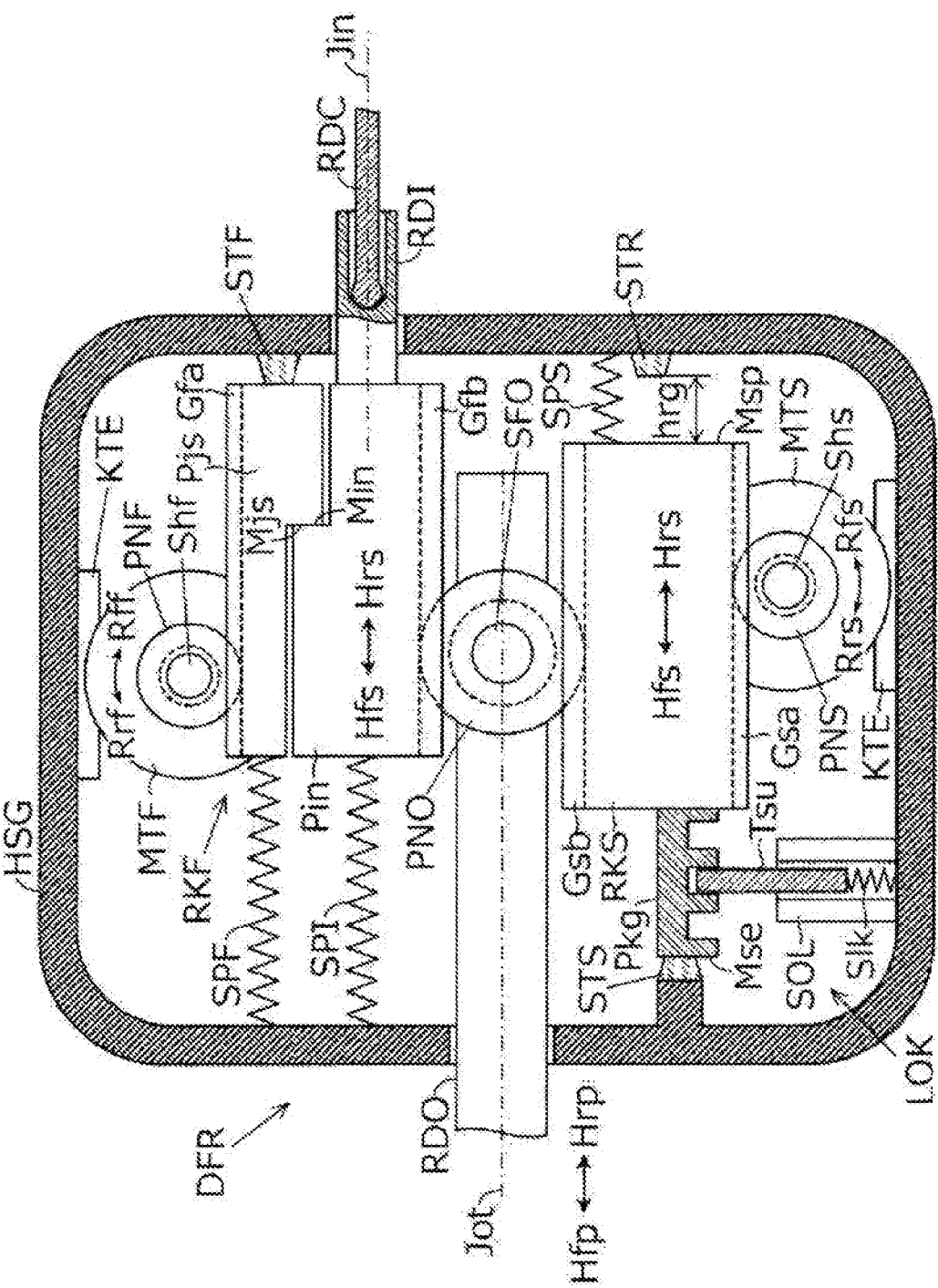
FIG. 5 is a schematic view describing a second embodiment of a differential mechanism DFR.

The configuration and operation of a second embodiment of the differential mechanism DFR provided in the actuator BAC will be described in detail with reference to a conceptual view of FIG. 5. Since the differential mechanism DFR is adopted for the braking actuator BAC, the force and the displacement are separated by the first and second electric motors MTF and MTS, and are independently controlled separately. Thus, the braking control device capable of regenerative coordination control can be configured with one master cylinder MC without adopting two master cylinders as in Patent Literature 1.

<<Configuration of Differential Mechanism DFR>>

First, the configuration of the differential mechanism DFR will be described. The differential mechanism DFR is formed by a rack and pinion mechanism (conversion mechanism between rotational movement and linear movement). In the rack-and-pinion mechanism, "a circular gear called a pinion gear" and "a rack in which teeth (rack gear) are provided so as to engage with a pinion gear on a flat plate shaped rod" are combined. The differential mechanism DFR is configured to include "first and second pinion gears PNF and PNS", "first and second racks RKF and RKS", "input and output rods RDI and RDO", and an output pinion gear PNO. Here, the "first and second pinion gears PNF and PNS", "first and second racks RKF and RKS", and the output pinion gear PNO correspond to the "transmission mechanism" of transmitting the outputs (power) of the "first and second electric motors MTF and MTS".

The differential mechanism DFR is configured by three transmission mechanisms. The "first transmission mechanism" transmits the output of the first electric motor MTF to the input rod RDI. Specifically, a combination of the first pinion gear PNF and a first input rack gear portion Gfa of the first rack RKF (rack and pinion mechanism) described below corresponds to the first transmission mechanism. The "second transmission mechanism" transmits the output of the second electric motor MTS to the output rod RDO. A combination of the second pinion gear PNS and a second input rack gear portion Gsa of the second rack RKS, and a combination of the output pinion PNO and a second output rack gear portion Gsb of the second rack RKS correspond to the second transmission mechanism. The "third transmission mechanism" transmits the output of the input rod RDI to the output rod RDO. A combination of the output pinion gear PNO and a first output rack gear portion Gfb of the second rack RKF corresponds to the third transmission mechanism. The differential mechanism DFR adjusts the relative movement between the input rod RDI and the output rod RDO.

The first and second electric motors MTF and MTS are fixed inside the housing HSG by a fixing member KTE. The first pinion gear PNF is fixed to the output shaft portion Shf of the first electric motor MTF. Similarly, the second pinion gear PNS is fixed to the output shaft portion Shs of the second electric motor MTS. A reduction gear may be provided in at least one of between the rotation shaft (first rotation shaft) Shf of the first electric motor MTF and the first pinion gear PNF, and between the rotation shaft (second rotation shaft) Shs of the second electric motor MTS and the second pinion gear PNS.

A connecting rod RDC is rotatably connected to the braking operation member BP by a clevis (U-shaped link). In the connecting rod RDC, the opposite side of the clevis portion is processed to a spherical shape and mechanically connected to the input rod RDI. That is, the input rod RDI and the braking operation member BP are mechanically connected through the connecting rod RDC. The braking operation member BP performs rotational movement at the mounting portion of the vehicle body BD, but the rotational movement of the braking operation member BP is effectively converted to the linear movement of the input rod RDI by the connecting rod RDC. A distal end of the input rod RDI (side opposite to the end connected to the braking operation member BP) is fixed to the first rack RKF.

The first rack RKF is smoothly movable along the input axis Jin (central axis of input rod RDI) with respect to the housing HSG. The first rack RKF is configured by two members, an input portion Pin and the assisting portion Pjs. This configuration is called "divided configuration". The input portion Pin and the assisting portion Pjs are formed along the input axis Jin so as to enable mutual displacement. The input rod RDI is fixed and the first output rack gear Gfb is formed on the input portion Pin, and the first output rack gear Gfb is engaged with the output pinion gear PNO. In the assisting portion Pjs, the first input rack gear Gfa is formed separate from the first output rack gear Gfb, and the first input rack gear Gfa is engaged with the first pinion gear PNF. Therefore, the rotational power of the first electric motor MTF is input to the assisting portion Pjs via the first pinion gear PNF. In the first rack RKF, the first output rack gear Gfb is located on the back side of the first input rack gear Gfa (opposite side with input axis Jin in between).

The input rod RDI is fixed to the first rack RKF (in particular, input portion Pin). Therefore, the output of the first electric motor MTF is converted from rotational movement to translational movement (movement in parallel direction) through the power transmission mechanism (first pinion gear PNF, first rack RKF) and transmitted to the input rod RDI.

A step perpendicular to the input axis Jin is provided in the input portion Pin, and a pressure receiving surface Min directed in the backward direction Hrf is formed. Similarly, a step perpendicular to the input axis Jin is provided in the assisting portion Pjs, and an assisting surface Mjs directed in the forward direction Hff is formed. The force Fjs in the forward direction Hff is applied by surface contact between the assisting surface Mjs and the pressure receiving surface Min. Here, the force Fjs acting on the input portion Pin from the assisting portion Pjs is referred to as "assisting force".

The power transmission (i.e., transmission of force) between the input portion Pin and the assisting portion Pjs has directivity. The assisting portion Pjs transmits power to the input portion Pin in the forward direction Hff but does not transmit power in the backward direction Hrf. On the other hand, the input portion Pin transmits power to the assisting portion Pjs in the backward direction Hrf but does not transmit power in the forward direction Hff. In other words, although the force is transmitted in the direction in which the assisting portion Pjs approaches the input portion Pin, the force is not transmitted in the direction in which the assisting portion Pjs separates from the input portion Pin. Therefore, in the first rack RKF, the assisting force Fjs generated by the first electric motor MTF is transmitted in the forward direction Hff but is not transmitted in the backward direction Hrf (opposite direction from forward direction Hff) by the configuration of the input portion Pin and the assisting portion Pjs.

The housing HSG is provided with a first stopper STF so as to inhibit the movement of the first rack RKF in the backward direction Hrf. The assisting portion Pjs of the first rack RKF is pressed in the backward direction Hrf by a first rack elastic body SPF (e.g., compression spring). The first rack elastic body SPF is provided between the housing HSG and an assisting portion second end face Mjp of the assisting portion Pjs, and when the first electric motor MTF is not energized, an assisting portion first end face Mje of the assisting portion Pjs is pressed against the first stopper STF provided in the housing HSG. When the braking operation member BP is not operated by the first rack elastic body SPF (i.e., when "Bpa=0"), the assisting portion first end face Mje is abutted to the first stopper STF.

Similarly, the input portion Pin of the first rack RKF is pressed in the backward direction Hrf by a return elastic body SPI (e.g., compression spring). The return elastic body SPI is provided between the housing HSG and an input portion second end face Mip of the input portion Pin, and in the normal case, the input portion Pin and the assisting portion Pjs are integrally moved. Here, "the normal case" means "when the first electric motor MTF operates properly and its power can be generated", and "when the operation of the braking operation member BP is not sudden, and the response of the first electric motor MTF can sufficiently follow the operation".

Similar to the first rack RKF, two rack gears Gsa and Gsb are formed in the second rack RKS. The output pinion gear PNO is engaged with the first output rack gear Gfb of the first rack RKF, and is also engaged with the second output rack gear Gsb of the second rack RKS. In the second rack RKS, a second input rack gear Gsa is formed on the back side of the second output rack gear Gsb separately from the second output rack gear Gsb. The second input rack gear Gsa is engaged with the second pinion gear PNS. Therefore, the output of the second electric motor MTS is converted from rotational movement to translational movement through the power transmission mechanism (second pinion gear PNS, second rack RKS, output pinion gear PNO) and transmitted to the output rod RDO.

In the second rack RKS, an engagement portion Pkg (a part of second rack RKS) is provided in addition to Gsa and Gsb. When the engagement portion Pkg and the claw portion Tsu engage with each other, a movement lock mechanism LOK (corresponding to "lock mechanism") that limits the movement of the second rack RKS is configured. The movement lock mechanism LOK is configured by the engagement portion Pkg of the second rack RKS and a solenoid SOL. Specifically, a plurality of lock grooves are formed in the engagement portion Pkg to allow the distal end of the claw portion Tsu to enter. For example, as the lock groove, a groove having a rectangular cross section with a plane perpendicular to the output axis Jot (input axis Jin) may be adopted. The claw portion Tsu of the solenoid SOL is separated from the claw portion Tsu and the engagement portion Pkg by the suction force generated when the solenoid SOL is excited. In this case, the second rack RKS is capable of performing translational movement (referred to as "released state") in which the claw portion Tsu is in a non-locked state of not being fitted in the lock groove of the engagement portion Pkg. On the other hand, when the solenoid SOL is not excited, the claw portion Tsu is pressed toward the engagement portion Pkg by the elastic body Slk (e.g., compression spring) of the solenoid SOL. Then, the movement of the second rack RKS is restrained (referred to as "locked state" by fitting the claw portion Tsu in the lock groove. In the locked state of the second rack RKS, the translational movement of the second rack RKS is restrained, and the movement in the backward direction Hrs is inhibited. The distal end of the claw portion Tsu has a rectangular cross-sectional shape so as to match the lock groove of the engagement portion Pkg.

The movement lock mechanism LOK is driven by the controller ECU. The movement lock mechanism LOK appropriately switches between the "locked state in which the movement of the second rack RKS is restrained" and the "released state in which the movement of the second rack RKS is allowed". Specifically, when the controller ECU energizes the second electric motor MTS, the movement lock mechanism LOK is switched to the released state. On the other hand, when the controller ECU does not energize the second electric motor MTS (including the case where energization cannot be performed due to a power supply failure), the movement lock mechanism LOK is switched to the locked state. The locked state of the movement lock mechanism LOK is achieved when the solenoid SOL is not energized so as to respond even to a case where the power supply, which is the drive source of the actuator BAC, is malfunctioning.

The housing HSG is provided with a second stopper STS so as to inhibit the movement of the second rack RKS in the forward direction Hfs. The second rack RKS is pressed in the forward direction Hfs by a second rack elastic body SPS (e.g., compression spring). A second rack elastic body SPS is provided between the housing HSG and a first end face Msp of the second rack RKS. When the braking operation member BP is not operated (i.e., when "Bpa=0") in the non-locked state, the second end face Mse of the second rack RKS is pressed against and abutted to the second stopper STS provided in the housing HSG by the second rack elastic body SPS. Therefore, this position is the initial position of the second rack RKS corresponding to the state in which the braking operation member BP is not operated. Furthermore, when the second electric motor MTS is not energized in the non-locked state, the second rack RKS is moved in the forward direction Hfs by the second rack elastic body SPS, and the second end face Mse is pressed against the second stopper STS.

A regenerative stopper STR is provided in the housing HSG on a side opposite to the second stopper STS with respect to the second rack RKS so as to inhibit the movement of the second rack RKS in the backward direction Hrs. The movement of the second rack RKS is limited to a predetermined displacement hrg by the second stopper STS and the regenerative stopper STR. That is, the range in which the second rack RKS can move is from the initial position (abutting position with second stopper STS corresponding to time of non-braking) to the predetermined displacement hrg. The movement of the second rack RKS in the backward direction Hrs corresponds to regenerative coordination control so as not to generate a friction braking force. For example, it can be set in advance as a value corresponding to a vehicle deceleration (e.g., from 0.2 to 0.3 G) generable by the electric driving device EDS (i.e., regenerative braking device). Here, the generable vehicle deceleration in the regenerative braking device EDS is determined based on the capacity of the power generator MTD, the energization amount of the controller ECD, and the like. Even when the controller ECU or the second electric motor MTS malfunctions by the displacement limitation hrg, the friction braking force can be reliably generated with the operation of the braking operation member BP.

The output pinion gear PNO is rotatably fixed to the output rod RDO by the rotating shaft SFO. The output rod RDO is smoothly movable along the output axis Jot (central axis of output rod RDO) with respect to the housing HSG. The central axis Jin and the central axis Jot are separate parallel axes, and are referred to as "separate axis configuration". The first and second racks RKF, RKS, and the output rod RDO is smoothly movable along the central axis Jin (central axis Jot) with respect to the housing HSG. That is, in the differential mechanism DFR, the first and second racks RKF, RKS, and the output rod RDO can be relatively moved in parallel and linearly to each other (in other words, relative movement is allowed).

When a tandem type master cylinder is adopted as master cylinder MC, two fluid pressure chambers Kma and Kmb are arranged in series. Thus, the dimension in the central axial direction Jot of the master cylinder MC becomes long. However, since the differential mechanism DFR having the separate axis configuration is adopted, the axial dimension is shortened and the structure is simplified. As a result, miniaturization of the entire device can be achieved. The configuration of the differential mechanism DFR has been described above.

<<Operation of Differential Mechanism DFR>>

Next, the operation of the differential mechanism DFR at the time the control device is malfunctioning will be described. As described above, in the movement of each element (first rack RKF, etc.) configuring the differential mechanism DFR, the movement in the "forward direction Hff, Hfs, Hfp" corresponds to an increase in the fluid pressure Pwa of the wheel cylinder WC. The linear movement in the forward direction corresponds to the rotational movement in the "forward rotating directions Rff, Rfs" of the first and second electric motors MTF, MTS. The movement in the "backward direction Hrf, Hrs, Hrp", which is the direction opposite to the forward direction Hff, Hfs, Hfp, corresponds to a decrease in the fluid pressure Pwa of the wheel cylinder WC. The linear movement in the backward direction corresponds to the rotational movement in the "reverse rotating direction Rrf, Rrs" of the first and second electric motors MTF, MTS.

If the first electric motor MTF or the first drive circuit DRF is malfunctioning, the first electric motor MTF is not energized. Specifically, in the controller ECU, the signals of the respective sensors (e.g., rotation angle of first electric motor MTF, current value of first drive circuit DRF) are taken into consideration, and the malfunction state of at least one of the first electric motor MTF and the first drive circuit DRF is determined. The first electric motor MTF is energized if the malfunction state is not determined (i.e., if first electric motor MTF and first drive circuit DRF are operating properly), and the energization of the first electric motor MTF is stopped if the malfunction state is determined. Therefore, in the malfunction state, the rotational power is not generated by the first electric motor MTF, and the assisting force Fjs is not generated.

When the braking operation member BP is operated and the input rod RDI is moved in the forward direction Hff in the malfunction state of the first electric motor MTF or the like, the input portion Pin does not exert force on the assisting portion Pjs due to the divided configuration of the RKF. Thus, the assisting portion Pjs is not moved, and only the input portion Pin is moved in the forward direction Hff. In this case, the assisting portion Pjs remains at a position abutting to the first stopper STF as it is pressed by the first rack elastic body SPF.

When the first rack RKF has an integral structure, the first electric motor MTF is rotated by the movement of the first rack RKF with the movement of the input rod RDI. Therefore, the operation force Fbp of the braking operation member BP is increased by the amount of rotation of the first electric motor MTF. That is, the first electric motor MTF becomes a resistance of the braking operation. In order to solve this problem, the divided configuration "of being divided into two members Pin and Pjs, and the power transmission between the input portion Pin and the assisting portion Pjs is achieved only in the forward direction Hff from the assisting portion Pjs to the input portion Pin and the backward direction Hrf from the input portion Pin to the assisting portion Pjs" is adopted for the first rack RKF. In other words, in the divided configuration, power is not transmitted in the backward direction Hrf from the assisting portion Pjs to the input portion Pin and in the forward direction Hff from the input portion Pin to the assisting portion Pjs. As a result, at the time of malfunctioning of the first electric motor MTF or the like, the operation force Fbp can be suppressed from becoming unnecessarily increased.

When at least one of the second electric motor MTS and the second drive circuit DRS is in the malfunction state, the second electric motor MTS is not energized as in the case of the first electric motor MTF or the like. Specifically, in the controller ECU, the signals of the respective sensors (e.g., rotation angle of second electric motor MTS, current value of second drive circuit DRS) are taken into consideration, and the malfunction state of at least one of the second electric motor MTS and the second drive circuit DRS is determined. The second electric motor MTS is energized if the malfunction state is not determined (i.e., if second electric motor MTS and second drive circuit DRS are operating properly), and the energization of the second electric motor MTS is stopped if the malfunction state is determined.

In the malfunction state of the second electric motor MTS, and the like, the second electric motor MTS is freely rotated and is not locked. For this reason, the locked state of the second rack RKS is not maintained, and the second rack RKS is movable in the backward direction Hrs. As a result, the amount of movement of the output rod RDO may be reduced more than a desired amount, and an increase in the fluid pressure Pma, Pmb of the master cylinder MC may be prevented.

In order to solve this problem, the movable distance of the second rack RKS is limited to within the range of the predetermined displacement hrg (i.e., range from abutting position with second stopper STS to abutting position with regenerative stopper STR) by the second stopper STS and the regenerative stopper STR. In this case, when the input rod RDI is moved in the forward direction Hff, the second rack RKS is moved in the backward direction Hrs by the output pinion gear PNO. After the second rack RKS abuts to the regenerative stopper STR, the movement of the second rack RKS is restricted, and it is not moved any further. As a result, the second rack RKS is locked, the output rod RDO is moved in the forward direction Hfp, and the fluid pressures Pma and Pmb of the master cylinder MC are increased.

In addition, the movement lock mechanism LOK is provided to switch between the "locked state in which the movement of the second rack RKS is restrained" and the "released state in which the movement of the second rack RKS is allowed". When the appropriate state of the control device is being determined by the controller ECU, the movement lock mechanism LOK achieves the released state. Specifically, in the controller ECU, a signal (control flag) FLsl for exciting the solenoid SOL is set to "1". The solenoid SOL is driven by the controller ECU based on "FLsl=1", which indicates the appropriate state, and a force against the solenoid elastic body Slk is generated. As a result, the engagement between the claw portion Tsu and the engagement portion Pkg (in particular, lock groove portion) is released, and the displacement of the second rack RKS can be controlled by the second electric motor MTS.

On the other hand, if the controller ECU determines that the operation of the control device is not appropriate or a malfunction state (malfunction state of at least one of second electric motor MTS and second drive circuit DRS) is determined, the movement lock mechanism LOK is switched to the locked state and the movement of the second rack RKS is restrained. Specifically, in the controller ECU, the drive signal (control flag) FLsl of the solenoid SOL is determined to "0". That is, the control flag FLsl is changed from "1" to "0" at the time point the device malfunction is determined (calculation cycle). The controller ECU stops the energization of the solenoid SOL based on "FLsl=0" indicating the malfunction state, and the attraction force of the solenoid SOL is not generated. As a result, the claw portion Tsu is pressed toward the engagement portion Pkg by the solenoid elastic body Slk built in the solenoid SOL, and the engagement of the claw portion Tsu and the engagement portion Pkg (particularly, the rectangular lock groove) is achieved. The movement lock mechanism LOK restrains the movement of the second rack RKS, and the second rack RKS is not moved in the backward direction Hrs nor in the forward direction Hfs.

When the input rod RDI is moved in the forward direction Hff, the second rack RKS receives a force in the backward direction Hrs by the output pinion gear PNO. However, due to the locked state of the movement lock mechanism LOK, the second rack RKS is not moved in the backward direction Hrs. As a result, the output rod RDO is moved in the forward direction Hfp, and the fluid pressures Pma and Pmb of the master cylinder MC increase. Since movement of the second rack RKS in the backward direction Hrs is restrained by the movement lock mechanism LOK at the time of device malfunction including a power supply failure, the fluid pressures Pma, Pmb of the master cylinder MC are efficiently generated by the operation of the braking operation member BP.

Third Embodiment of Differential Mechanism DFR

Figure 6:
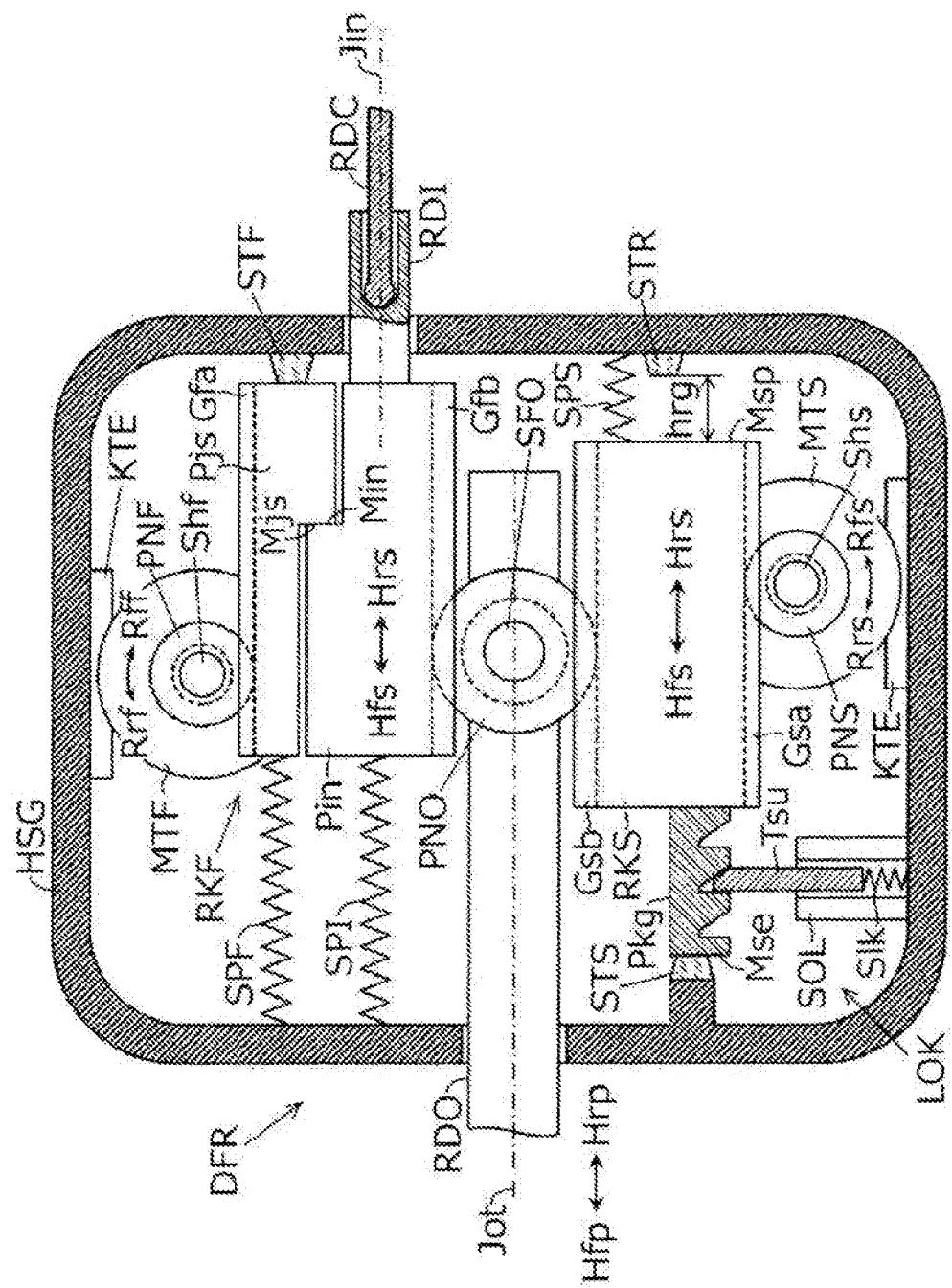
FIG. 6 is a schematic view describing a third embodiment of the differential mechanism DFR.

A third embodiment of the differential mechanism DFR will be described with reference to a schematic view of FIG. 6. In the second embodiment of the differential mechanism DFR, a rectangular cross-sectional groove having a plane perpendicular to the output axis Jot is adopted as the plurality of lock grooves of the engagement portion Pkg, and the second rack RKS is restrained in the forward direction Hfs and the backward direction Hrs and is not moved at all along the output axis Jot in the locked state of the movement lock mechanism LOK. Instead, in the third embodiment of the differential mechanism DFR, the movement of the second rack RKS has directivity in the locked state of the movement lock mechanism LOK (correspond to "lock mechanism"). The differences from the second embodiment will be described below.

In the lock groove of the engagement portion Pkg, one of the two surfaces that are not parallel to the output axis Jot is an inclined surface. Specifically, in the groove shape, the first surface of the lock groove is perpendicular to the output axis Jot, is closer to the second stopper STS, and is directed in the backward direction Hrs. Therefore, the movement of the second rack RKS in the backward direction Hrs is restrained by the first surface of the lock groove. The second surface of the lock groove (side away from second stopper STS) faces the first surface of the lock groove. The second surface is not perpendicular to the output axis Jot, and has an inclination. That is, the second surface of the lock groove is formed as an inclined surface. Similar to the second embodiment, the distal end portion of the claw portion Tsu is formed as a shape having an inclined surface so as to match the first surface and the second surface of the lock groove.

The second rack RKS is pressed in the forward direction Hfs by the second rack elastic body SPS even in a state in which the claw portion Tsu is fitted in the lock groove (i.e., locked state). As the second rack RKS is pressed in the forward direction Hfs, the claw portion Tsu is sled on the second surface of the lock groove thus moving out of the lock groove, and is then fitted into the next lock groove. By repeating such an operation, the second rack elastic body SPS is moved in the forward direction Hfs until the second end face Mse abut to the second stopper STS by the second surface of the lock groove and the inclined surface of the claw portion Tsu corresponding thereto even at the time of power supply failure. For example, when the power supply failure occurs in a state in which the second stopper STS and the second end face Mse of the second rack RKS are separated (time point malfunction state is determined), the claw portion Tsu and the lock groove are immediately engaged. Then, in the engagement state of the movement lock mechanism LOK, the second rack RKS is pressed by the elastic force of the second rack elastic body SPS and returned to the initial position of the second rack RKS. Here, the initial position is a position corresponding to the non-braking operation (i.e., "Bpa=0") when the device is appropriate, and is a position where the second rack RKS (in particular, second end face Mse) makes contact with the second stopper STS. Since the movement lock mechanism LOK has directivity, the movement of the second rack RKS in the backward direction Hrs can be reliably restricted, and the second rack RKS can be returned to the initial position.

Fourth Embodiment of Differential Mechanism DFR

Figure 7:
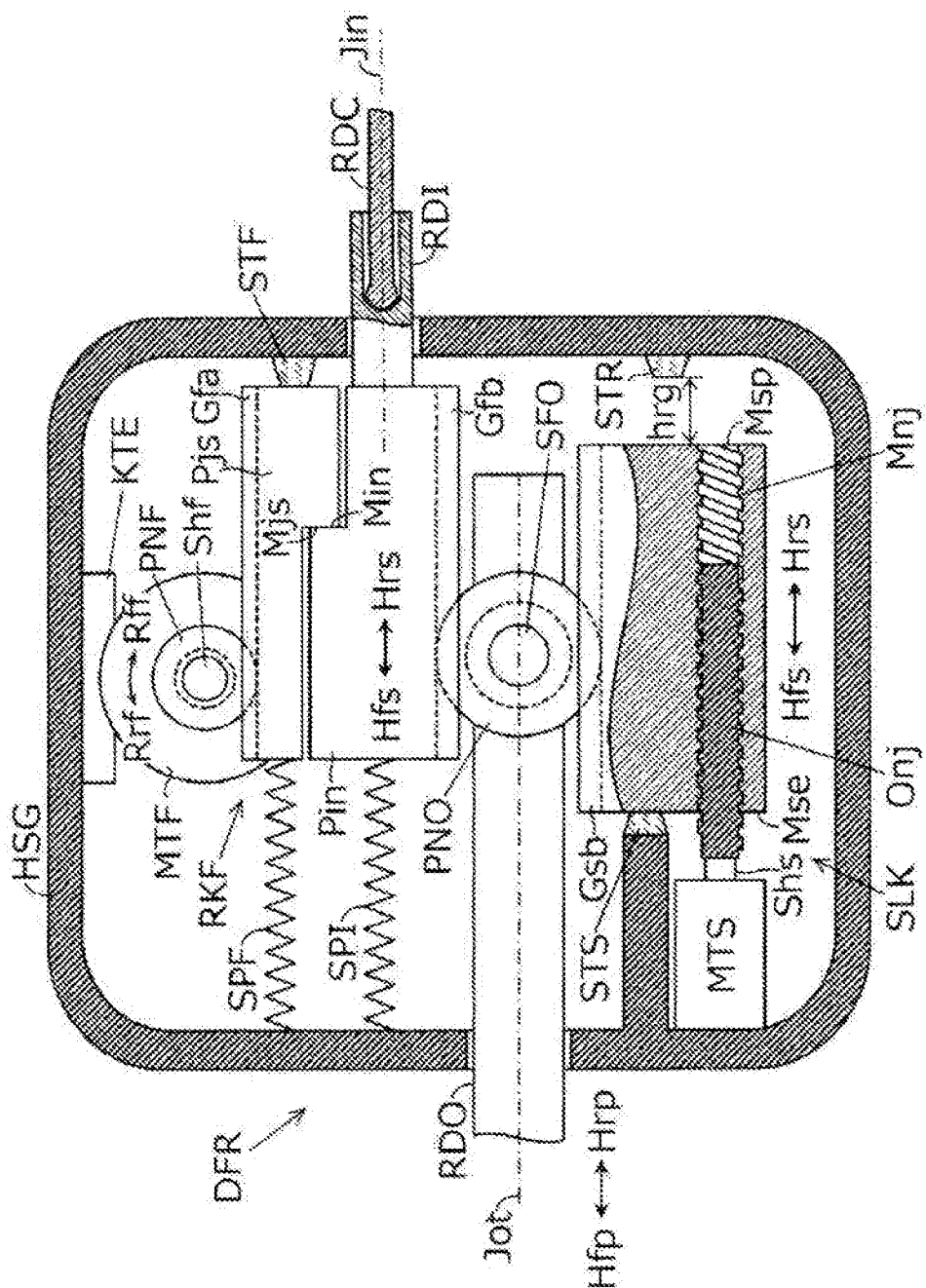
FIG. 7 is a schematic view describing a fourth embodiment of the differential mechanism DFR.

A fourth embodiment of the differential mechanism DFR will be described with reference to a schematic view of FIG. 7. In the second and third embodiments, the movement of the second rack RKS in the backward direction Hrs is restrained by the movement lock mechanism LOK driven by the solenoid SOL. In the fourth embodiment, in place of the movement lock mechanism LOK, a self-locking mechanism SLK having directivity of power transmission (corresponds to "lock mechanism") is adopted as a power transmission mechanism between the second electric motor MTS and the second rack RKS. Hereinafter, differences from the second and third embodiments will be described.

A male screw Onj is formed on the output shaft Shs of the second electric motor MTS. A female screw Mnj is formed in the second rack RKS so as to be screw fitted with the male screw Onj. The self-locking mechanism SLK (specifically, trapezoidal screw mechanism) is configured by the male screw Onj and the female screw Mnj. The self-locking mechanism SLK has a self-locking function and can transmit power from the second electric motor MTS to the second rack RKS but cannot transmit power from the second rack RKS to the second electric motor MTS. That is, in the self-locking mechanism SLK, the positive efficiency in the case of converting the rotation into a straight line is larger than "0". However, the reverse efficiency in the case of converting the straight line into rotation is "0". The self-locking mechanism of the self-locking mechanism SLK is mechanically set by the items (lead, contact angle, friction coefficient, etc.) of the trapezoidal screw.

When the second electric motor MTS is not energized such as at the time of power supply failure, and the like, the movement of the second rack RKS is restrained by the self-locking mechanism SLK. That is, the second rack RKS is not moved in the forward direction Hfs nor in the backward direction Hrs. Therefore, at the time the second electric motor MTS is not energized, when the input rod RDI is moved in the forward direction Hff, the output rod RDO is moved in the forward direction Hfp, and the fluid pressures Pma, Pmb of the master cylinder MC are increased. The operation of the braking operation member BP can be efficiently converted to the fluid pressure Pma, Pmb of the master cylinder MC at the time of device malfunction including the power supply failure by the self-locking mechanism SLK. When the self-locking mechanism SLK is adopted, the second electric motor MTS is not rotated by the movement of the second rack RKS, and hence the second rack elastic body SPS (elastic body for returning to initial position) is omitted.

A worm gear mechanism may be employed as the self-locking mechanism SLK. The worm gear mechanism is formed by a worm (screw gear) and a worm wheel (helical gear). The output shaft Shs of the second electric motor MTS is connected to the worm, and the second rack RKS is connected to the worm wheel. The self-locking function (power transmission from worm wheel side toward worm side is not possible) of the worm gear mechanism is set by decreasing the lead angle of the worm groove. When the worm gear mechanism is adopted, a rotational/linear movement conversion mechanism (e.g., screw mechanism) that converts the rotational movement of the worm wheel into the linear movement of the second rack RKS is provided.

Other Embodiments

Hereinafter, other embodiments (modified examples) will be described. In these cases as well, the braking actuator BAC achieves effects similar to above (satisfying both performance of control device and failsafe, ensuring suitable braking operation characteristics at the time of power supply failure, etc.).

In the second to fourth embodiments described above, the disk type braking device has been exemplified as the device for applying the braking torque to the rotating member KT (i.e., wheel WH). Instead, a drum type braking device (drum brake) may be adopted. In the case of a drum brake, a brake drum is adopted in place of the caliper CP. The friction member is a brake shoe, and the rotating member KT is a brake drum.

Furthermore, in the second to fourth embodiments described above, a diagonal type (also referred to as "X type") has been illustrated as the two system hydraulic circuit (configuration of braking piping). Instead, an anterior-posterior type (also referred to as "H-type") configuration may be adopted. In this case, the first fluid path HKA is fluidly connected to the front wheel wheel cylinders WCfr, WCfl, and the second fluid path HKB is fluidly connected to the rear wheel wheel cylinders WCrr, WCrl.

In the second to fourth embodiments described above, an example in which an electric motor for driving is adopted as the power generator MTD has been described. However, that which does not function for driving and which only has a power generating function may be adopted as the power generator MTD. Even in this case, the power generator MTD is mechanically connected to the wheel WH, and kinetic energy of the vehicle is regenerated as power at the time of vehicle deceleration. At this time, regenerative braking force is applied to the wheel WH.

In the second to fourth embodiments described above, the three stoppers STF, STS, STR are illustrated as being fixed to the housing HSG. However, the stoppers STF, STS, and STR merely need to be that which can restrain the displacement of the first and second racks RKF, RKS. Therefore, at least one of the stoppers STF, STS, STR can be fixed not to the housing HSG but to another structural member. Even in this case, the stopper can inhibit the movement of the racks RKF, RKS so as not to be displaced.

In the second embodiment described with reference to FIG. 5, the first pinion gear PNF is fixed to the output shaft Shf of the first electric motor MTF, and the second pinion gear PNS is fixed to the rotation shaft Shs of the second electric motor MTS. At least one of the first pinion gear PNF and the second pinion gear PNS can be mechanically connected to the rotation shafts (output shafts) Shf and Shs of the respective electric motors MTF and MTS through a reduction gear. In this case as well, the first pinion gear PNF is mechanically connected to the rotation shaft Shf of the first electric motor MTF, and the second pinion gear PNS is mechanically connected to the rotation shaft Shs of the second electric motor MTS.

In the second to fourth embodiments described above, the displacement of the second rack RKS is limited within the range of the predetermined displacement hrg. Alternatively, the movement of the structural member of the second transmission mechanism in the backward direction Hrs may be limited to within the range of the predetermined displacement hrg. The power is transmitted from the second electric motor MTS to the output rod RDO in the order of "PNS Gsa Gsb PNO" by the second transmission mechanism. For example, in the second pinion gear PNS, the rotational displacement in the backward direction Hrs (i.e., reverse rotating direction Rrs) is limited to within the range of the predetermined displacement hrg.

<First Rack RKF>

Figure 8A:
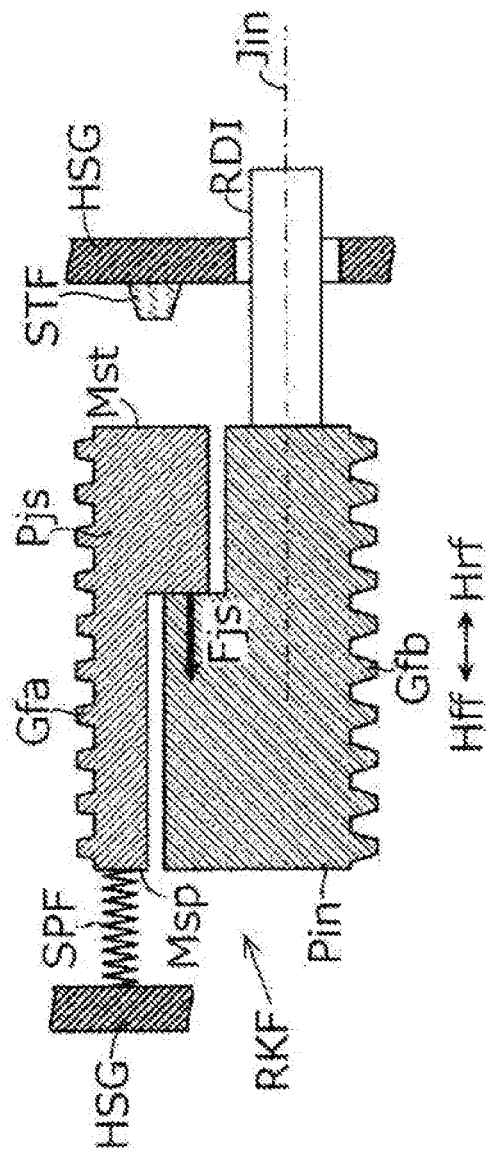
FIG. 8A and FIG. 8B are schematic views describing a first rack RKF of a differential mechanism DFR.
Figure 8B:
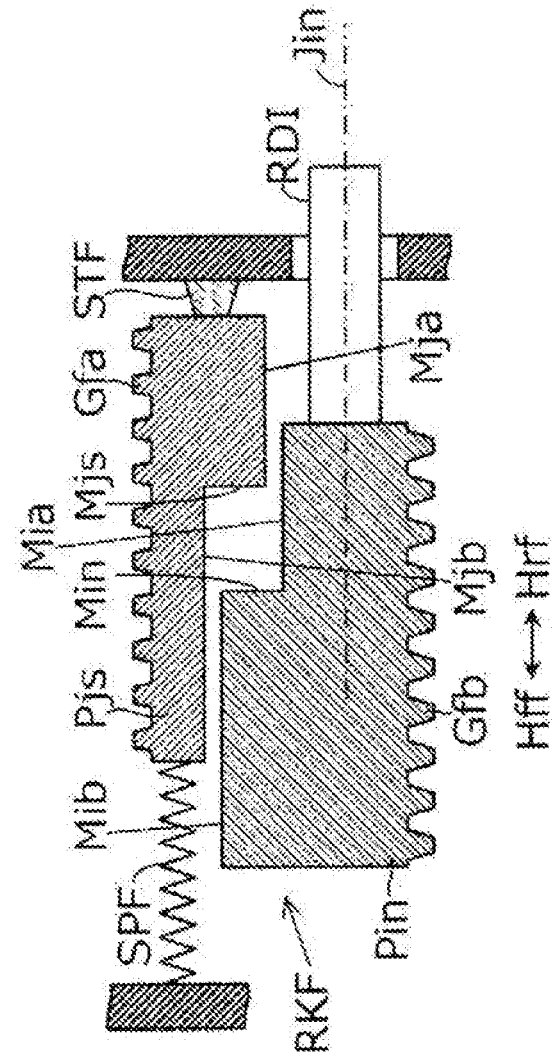

The first rack RKF of the differential mechanism DFR will be described with reference to FIG. 8. The first rack RKF is configured by two members Pin and Pjs. The configuration is called "divided configuration". FIG. 8(a) shows a case where the first electric motor MTF is operated appropriately, and the input portion Pin and the assisting portion Pjs are moved integrally. FIG. 8(b) shows a case where the operation of the first electric motor MTF is not appropriate and only the input portion Pin is moved.

The input portion Pin has two surfaces Mia, Mib parallel to the input axis Jin (center line of the input rod RDI). The distance between the input portion front half surface Mia and the input axis Jin is shorter than the distance between the input portion rear half surface Mib and the input axis Jin. That is, the input portion front half surface Mia is closer to the input axis Jin than the input portion rear half surface Mib, where a step is formed at the boundary between the input portion front half surface Mia and the input portion rear half surface Mib thus forming a pressure receiving surface Min. The pressure receiving surface Min is directed in the backward direction Hrf. The input rod RDI is fixed to one (input portion first end face) Mie of the end faces (surfaces orthogonal to input axis Jin) of the input portion Pin. A return elastic body SPI is provided on the other end face (input portion second end face) Mip opposite to the input portion first end face Mie, and is pressed by the return elastic body SPI.

Similar to the input portion Pin, the assisting portion Pjs has two surfaces Mja and Mjb parallel to the input axis Jin. The distance between an assisting portion front half surface Mja and the input axis Jin is shorter than the distance between an assisting portion rear half surface Mjb and the input axis Jin. That is, the assisting portion front half surface Mja is closer to the input axis Jin than the assisting portion rear half surface Mjb, where a step is formed at the boundary between the assisting portion front half surface Mja and the assisting portion rear half surface Mjb thus forming an assisting surface Mjs. The assisting surface Mjs faces is directed in the forward direction Hff. The assisting surface Mjs of the assisting portion Pjs contacts the pressure receiving surface Min of the input portion Pin at a surface. For example, the pressure receiving surface Min and the assisting surface Mjs are orthogonal to the input axis Jin. One (assisting portion first end face) Mje of the end faces (surface orthogonal to input axis Jin) of the assisting portion Pjs can be brought into contact with the first stopper STF. The first rack elastic body SPF is provided on the other end face (assisting portion second end face) Mjp opposite to the assisting portion first end face Mje, and is pressed by the first rack elastic body SPF.

Transmission of force between the input portion Pin and the assisting portion Pjs is performed by surface contact between the pressure receiving surface Min and the assisting surface Mjs. Since the pressure receiving surface Min is directed in the backward direction Hrf and the assisting surface Mjs is directed in the forward direction Hff, the transmission of force has directivity. Specifically, the force is transmitted in the direction in which the pressure receiving surface Min and the assisting surface Mjs approach, but the force is not transmitted in the direction in which the pressure receiving surface Min and the assisting surface Mjs separate. Therefore, the assisting portion Pjs transmits power to the input portion Pin in the forward direction Hff, and the input portion Pin transmits power to the assisting portion Pjs in the backward direction Hrf. On the other hand, the assisting portion Pjs does not transmit power to the input portion Pin in the backward direction Hrf, and the input portion Pin does not transmit power to the assisting portion Pjs in the forward direction Hff.

A case where the operation of the first electric motor MTF 15 appropriate will be described with reference to FIG. 8(a). When the operation of the braking operation member BP (i.e., the braking operation amount Bpa) is increased, the input portion Pin is moved in the forward direction Hff by the input rod RDI. Furthermore, the assisting portion Pjs is moved in the forward direction Hff by the first pinion gear PNF by the first electric motor MTF driven based on the operation amount Bpa. In this case, the rotational power of the first electric motor MTF is applied from the assisting surface Mjs to the pressure receiving surface Min, and acts as the assisting force Fj s. As a result, the operation force Fbp of the driver is adjusted by the assisting force Fjs so as to be reduced. When the pressure receiving surface Min and the assisting surface Mjs are formed as surfaces perpendicular to the input axis Jin, the assisting force Fj s is transmitted along the input axis Jin and thus the transmission efficiency is high.

When the operation of the braking operation member BP is reduced, the input rod RDI is pulled back by the pedal return spring SPB. Then, the input portion Pin is moved in the backward direction Hrf by the input rod RDI. Furthermore, the assisting portion Pjs is moved by the first electric motor MTF in the backward direction Hrf while maintaining the assisting force Fjs. When the operation of the braking operation member BP is canceled by the return elastic body SPI and the first rack elastic body SPF (i.e., case of "Bpa=0"), the input portion Pin and the assisting portion Pjs can be reliably returned to the initial state (state in which pressure receiving surface Min and assisting surface Mjs are abutted and the assisting portion first end face Mje is abutted to the first stopper STF).

A case where the operation of the first electric motor MTF is not appropriate will be described with reference to FIG. 8(b). When the operation of the braking operation member BP is increased, the input portion Pin is moved in the forward direction Hff, but the first electric motor MTF remains stopped, so that the assisting portion Pjs is not moved and a state in which the assisting portion first end face Mje is abutted to the first stopper STF is maintained. That is, since power is not transmitted in the forward direction Hff from the input portion Pin to the assisting portion Pjs, surface contact between the input portion Pin and the assisting portion Pjs is released. In this case, the assisting force Fjs is not acted, and hence the movement of the input portion Pin is performed only by the operation force Fbp of the driver. However, since the first electric motor MTF is not rotated by the input rod RDI, an increase in the operation force Fbp can be suppressed. When the operation of the braking operation member BP is reduced, the input portion Pin is moved in the backward direction Hrf by the input rod RDI and the return elastic body SPI.

As described above, since the first rack RKF adopts the divided configuration, the power from the first electric motor MTF to the input rod RDI is transmitted in the forward direction Hff, but is not transmitted in the backward direction Hrf (a direction opposite to the forward direction Hff). Specifically, the assisting portion Pjs includes the assisting surface Mjs directed in the forward direction Hff, and the input portion Pin includes pressure receiving surface Min directed in the backward direction Hrf. Therefore, the force from the assisting surface Mjs to the pressure receiving surface Min is applied in the forward direction Hff by surface contact between the assisting surface Mjs and the pressure receiving surface Min. However, since the assisting surface Mjs and the pressure receiving surface Min are separated, the force is not applied in the backward direction Hrf. Thus, in the malfunction state of the first electric motor MTF or the like, the first electric motor MTF is not rotated by the input rod RDI. Therefore, the driver's operation force Fbp is not consumed to rotate the first electric motor MTF. As a result, at the time of malfunctioning of the first electric motor MTF or the like, the operation force Fbp can be suppressed from becoming unnecessarily increased.

In addition, the divided configuration of the first rack RKF has the same effect even when the braking operation member BP is suddenly operated. Although there is a limit to the output of the first electric motor MTF, when the braking operation member BP is operated extremely fast, the surface contact between the input portion Pin and the assisting portion Pjs is released. Thus, even in the case of a very fast braking operation, the first electric motor MTF can be avoided from becoming a resistance, and satisfactory operation characteristics can be ensured.

Other Embodiments

Hereinafter, other embodiments (modified examples) will be described. In these cases as well, the braking actuator BAC has the same effect as described above (operation characteristics at time of malfunctioning of first electric motor MTF or the like, or at time of sudden operation is ensured).

In the embodiments described above, a disk type braking device has been illustrated as a device for applying the braking torque to the rotating member KT (i.e., wheel WH). Instead, a drum type braking device (drum brake) may be adopted. In the case of a drum brake, a brake drum is adopted in place of the caliper CP. The friction member is a brake shoe, and the rotating member KT is a brake drum.

Furthermore, in the embodiments described above, a diagonal type (also referred to as "X type") has been illustrated as the two system hydraulic circuit (configuration of braking piping). Instead, an anterior-posterior type (also referred to as "H-type") configuration may be adopted. In this case, the first fluid path HKA is fluidly connected to the front wheel wheel cylinders WCfr, WCfl, and the second fluid path HKB is fluidly connected to the rear wheel wheel cylinders WCrr, WCrl.

In the embodiments described above, an example in which an electric motor for driving is adopted as the power generator MTD has been described. However, that which does not function for driving and which only has a power generating function may be adopted as the power generator MTD. Even in this case, the power generator MTD is mechanically connected to the wheel WH, and kinetic energy of the vehicle is regenerated as power at the time of vehicle deceleration. At this time, regenerative braking force is applied to the wheel WH.

In the embodiments described above, the three stoppers STF, STS, STR are illustrated as being fixed to the housing HSG. However, the stoppers STF, STS, and STR merely need to be that which can restrain the displacement of the first and second racks RKF, RKS. Therefore, at least one of the stoppers STF, STS, STR can be fixed not to the housing HSG but to another structural member. Even in this case, the stopper can inhibit the movement of the racks RKF, RKS so as not to be displaced.

In the embodiment described with reference to FIG. 3, the first pinion gear PNF is fixed to the output shaft Shf of the first electric motor MTF, and the second pinion gear PNS is fixed to the rotation shaft Shs of the second electric motor MTS. At least one of the first pinion gear PNF and the second pinion gear PNS can be mechanically connected to the rotation shafts (output shafts) Shf and Shs of the respective electric motors MTF and MTS through a reduction gear. In this case as well, the first pinion gear PNF is mechanically connected to the rotation shaft Shf of the first electric motor MTF, and the second pinion gear PNS is mechanically connected to the rotation shaft Shs of the second electric motor MTS.

In the embodiments described above, the displacement of the second rack RKS is limited within the range of the predetermined displacement hrg. Alternatively, the movement of the structural member of the second transmission mechanism in the backward direction Hrs may be limited to within the range of the predetermined displacement hrg. The power is transmitted from the second electric motor MTS to the output rod RDO in the order of "PNS→Gsa→Gsb→PNO" by the second transmission mechanism. For example, in the second pinion gear PNS, the rotational displacement in the backward direction Hrs (i.e., reverse rotating direction Rrs) is limited to within the range of the predetermined displacement hrg.

The invention claimed is:

1. A braking control device for a vehicle that pressure feeds a braking fluid from a master cylinder to a wheel cylinder in accordance with an operation of a braking operation member of the vehicle to generate a braking torque on wheels of the vehicle, the braking control device comprising:
    an input rod connected to the braking operation member;
    an output rod that is movable parallel to a central axis of the input rod and that presses a piston in the master cylinder;
    a first electric motor that generates an assisting force with the input rod;
    a second electric motor that adjusts displacement of the output rod;
    a differential mechanism that is configured by a first transmission mechanism for transmitting output of the first electric motor to the input rod, a second transmission mechanism for transmitting output of the second electric motor to the output rod, and a third transmission mechanism for transmitting output of the input rod to the output rod, and that adjusts a relative movement between the input rod and the output rod; and
    a controller that controls the first electric motor and the second electric motor to independently control an operation force acting on the input rod and the displacement,
    wherein the second transmission mechanism is configured so that movement in a backward direction corresponding to decrease in fluid pressure in the master cylinder is limited to within a predetermined displacement range.

2. The braking control device for the vehicle according to claim 1, wherein the predetermined displacement is set to a value corresponding to deceleration of the vehicle generable by a regenerative braking device of the vehicle.

3. A braking control device for a vehicle that pressure feeds a braking fluid from a master cylinder to a wheel cylinder in accordance with an operation of a braking operation member of the vehicle to generate a braking torque on wheels of the vehicle, the braking control device comprising:
    an input rod connected to the braking operation member;
    an output rod that is movable parallel to a central axis of the input rod and that presses a piston in the master cylinder;
    a first electric motor that generates an assisting force with the input rod;
    a second electric motor that adjusts displacement of the output rod;
    a first pinion gear connected to the first electric motor;
    a second pinion gear connected to the second electric motor;
    a first rack including a first input rack gear portion that engages the first pinion gear and a first output rack gear portion different from the first input rack gear portion;
    a second rack including a second input rack gear portion that engages the second pinion gear and a second output rack gear portion different from the second input rack gear portion;
    an output pinion gear that is rotatably supported by the output rod and that engages with the first output rack gear portion and the second output rack gear portion; and
    a controller that controls the first electric motor and the second electric motor to independently control an operation force acting on the input rod and the displacement,
    wherein the second rack is configured so that movement in a backward direction corresponding to decrease in fluid pressure in the master cylinder is limited to within a predetermined displacement range.

4. The braking control device for the vehicle according to claim 3, further comprising:
    a stopper that inhibits movement in a direction opposite to the backward direction of the second rack; and
    an elastic body that generates a force for pressing the second rack against the stopper.

5. The braking control device for the vehicle according to claim 4, wherein the elastic body is configured to maintain contact between the second rack and the stopper until the deceleration of the vehicle becomes greater than 0.3 G when the second electric motor is not energized.

6. A braking control device for a vehicle that pressure feeds a braking fluid from a master cylinder to a wheel cylinder in accordance with an operation of a braking operation member of the vehicle to generate a braking torque on wheels of the vehicle, the braking control device comprising:
    an input rod connected to the braking operation member;
    an output rod that is movable parallel to a central axis of the input rod and that presses a piston in the master cylinder;
    a first electric motor that generates an assisting force with the input rod;
    a second electric motor that adjusts displacement of the output rod;
    a differential mechanism that is configured by a first transmission mechanism for transmitting output of the first electric motor to the input rod, a second transmission mechanism for transmitting output of the second electric motor to the output rod, and a third transmission mechanism for transmitting output of the input rod to the output rod, and that adjusts a relative movement between the input rod and the output rod;

a controller that controls the first electric motor and the second electric motor to independently control an operation force acting on the input rod and the displacement; and a lock mechanism that restrains movement in a backward direction corresponding to decrease in fluid pressure in the master cylinder of the second transmission mechanism when the second electric motor is not energized.

7. The braking control device for the vehicle according to claim 6, wherein the lock mechanism switches between a locked state in which movement of the second transmission mechanism is restrained and a released state in which the movement of the second transmission mechanism is allowed, and the controller is configured to drive the lock mechanism, and achieve the locked state when the second electric motor is not energized and achieve the released state when the second electric motor is energized.

8. The braking control device for the vehicle according to claim 7, wherein the controller determines whether or not the second electric motor is malfunctioning, and stop energization of the second electric motor to achieve the locked state when determining that the second electric motor is malfunctioning.

9. The braking control device for the vehicle according to claim 6, wherein the lock mechanism is configured to transmit power from the second electric motor to the output rod, but not to transmit power from the output rod to the second electric motor.

\* \* \* \* \*